Jan. 13, 1959 E. I. VALYI 2,867,867
SHELL MOLDING MACHINE
Filed April 15, 1957 13 Sheets-Sheet 4

INVENTOR
Emery I. Valyi
BY
ATTORNEY

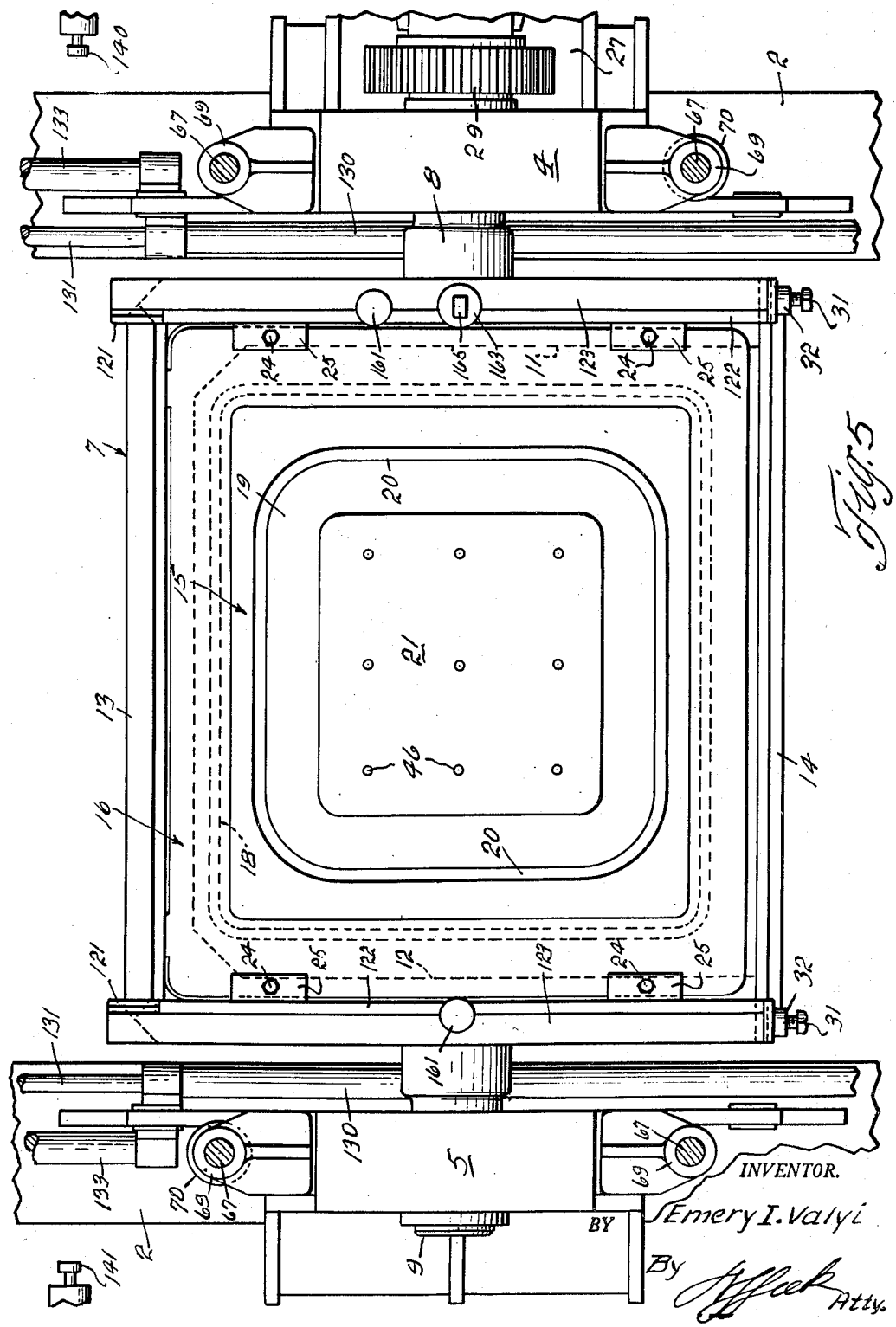

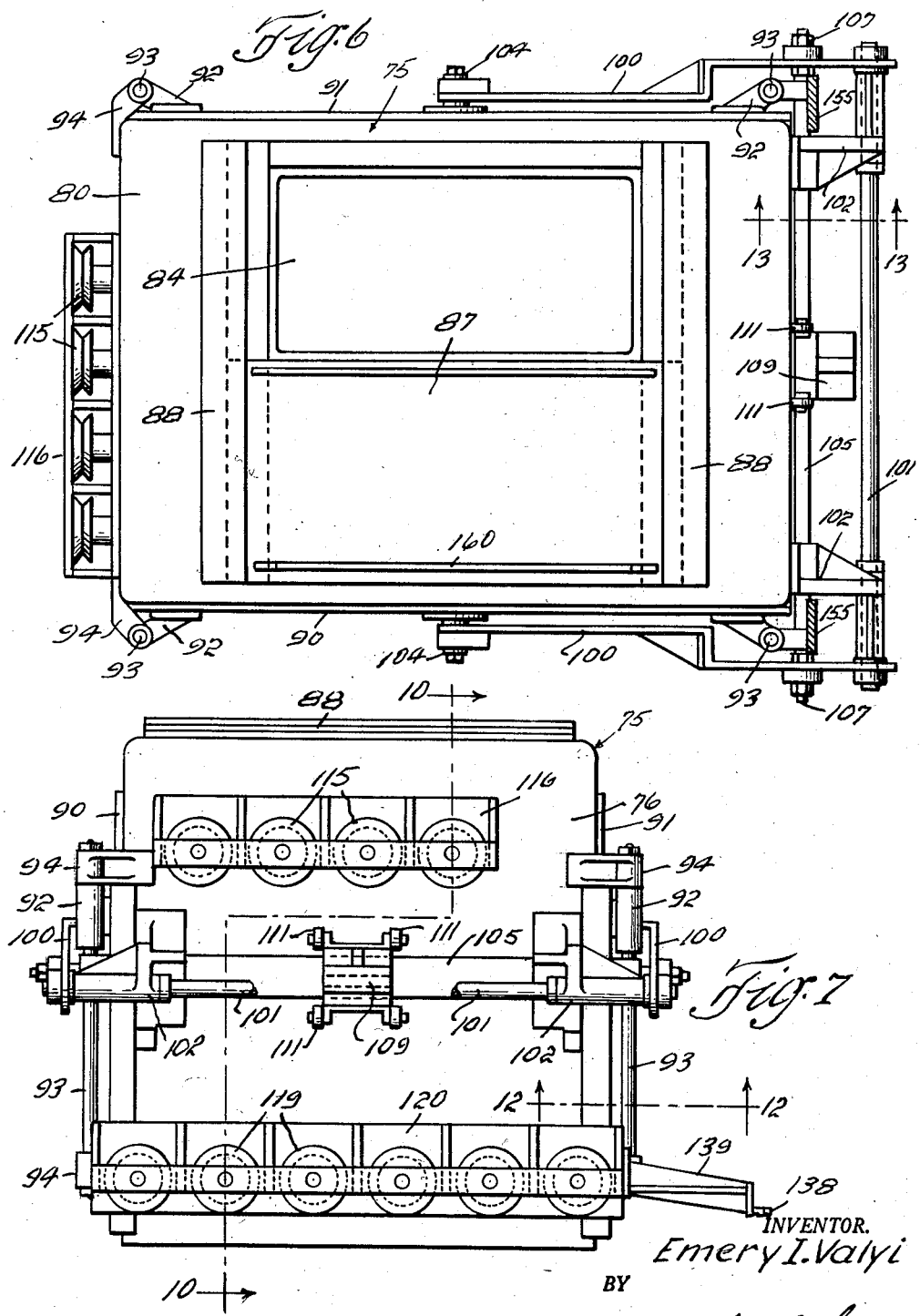

Jan. 13, 1959
E. I. VALYI
2,867,867
SHELL MOLDING MACHINE
Filed April 15, 1957
13 Sheets-Sheet 7
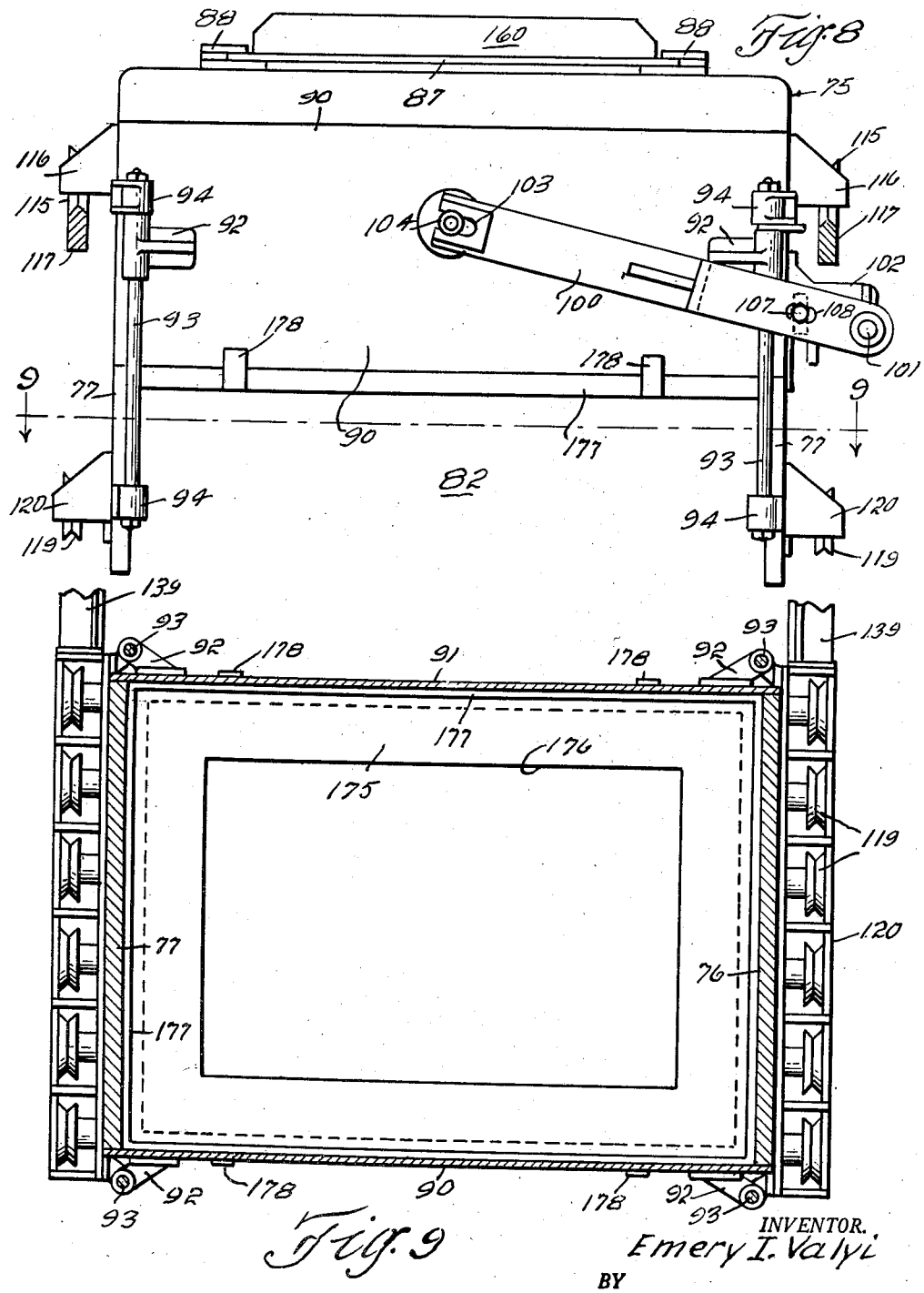
INVENTOR.
Emery I. Valyi
BY
Atty.

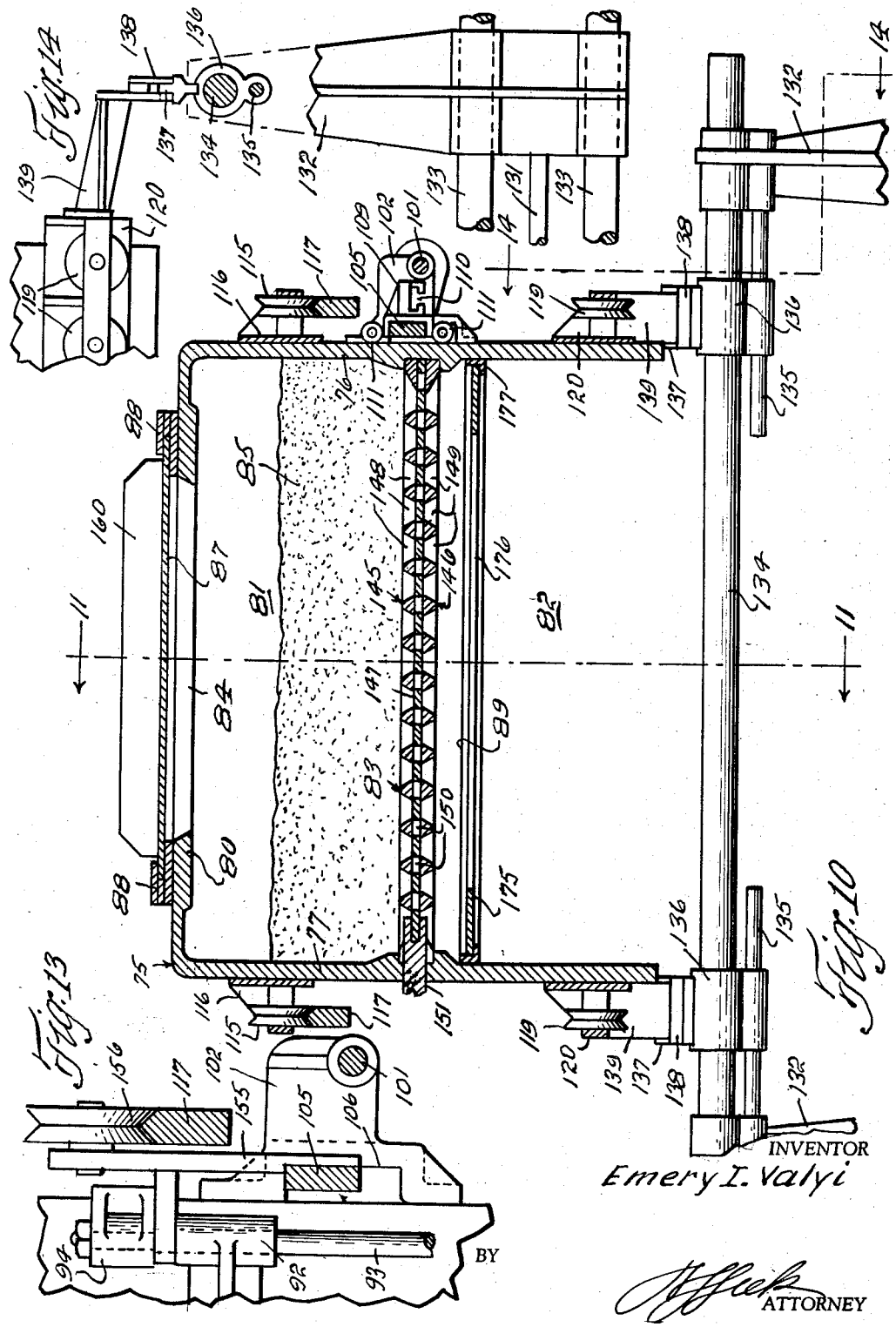

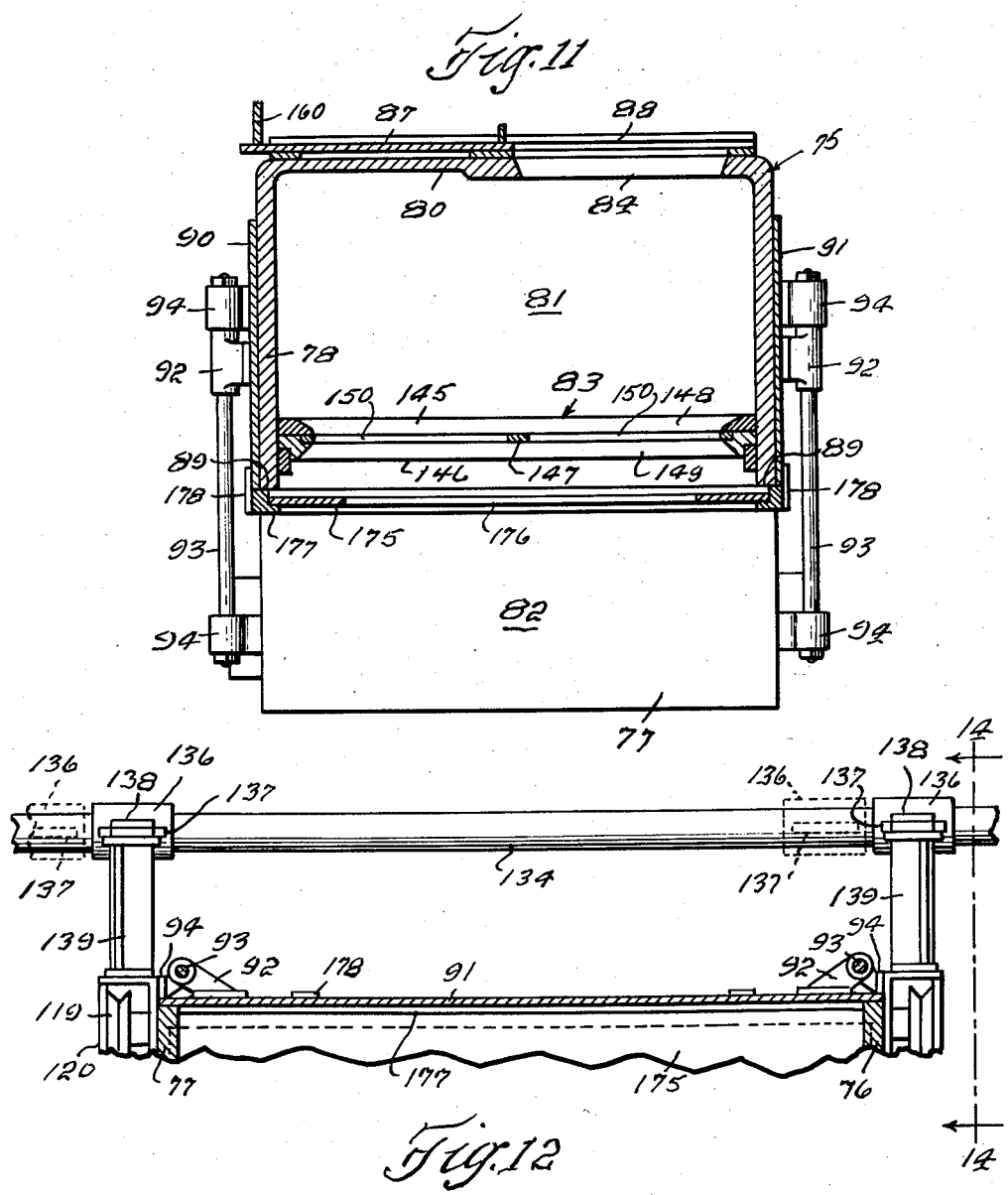

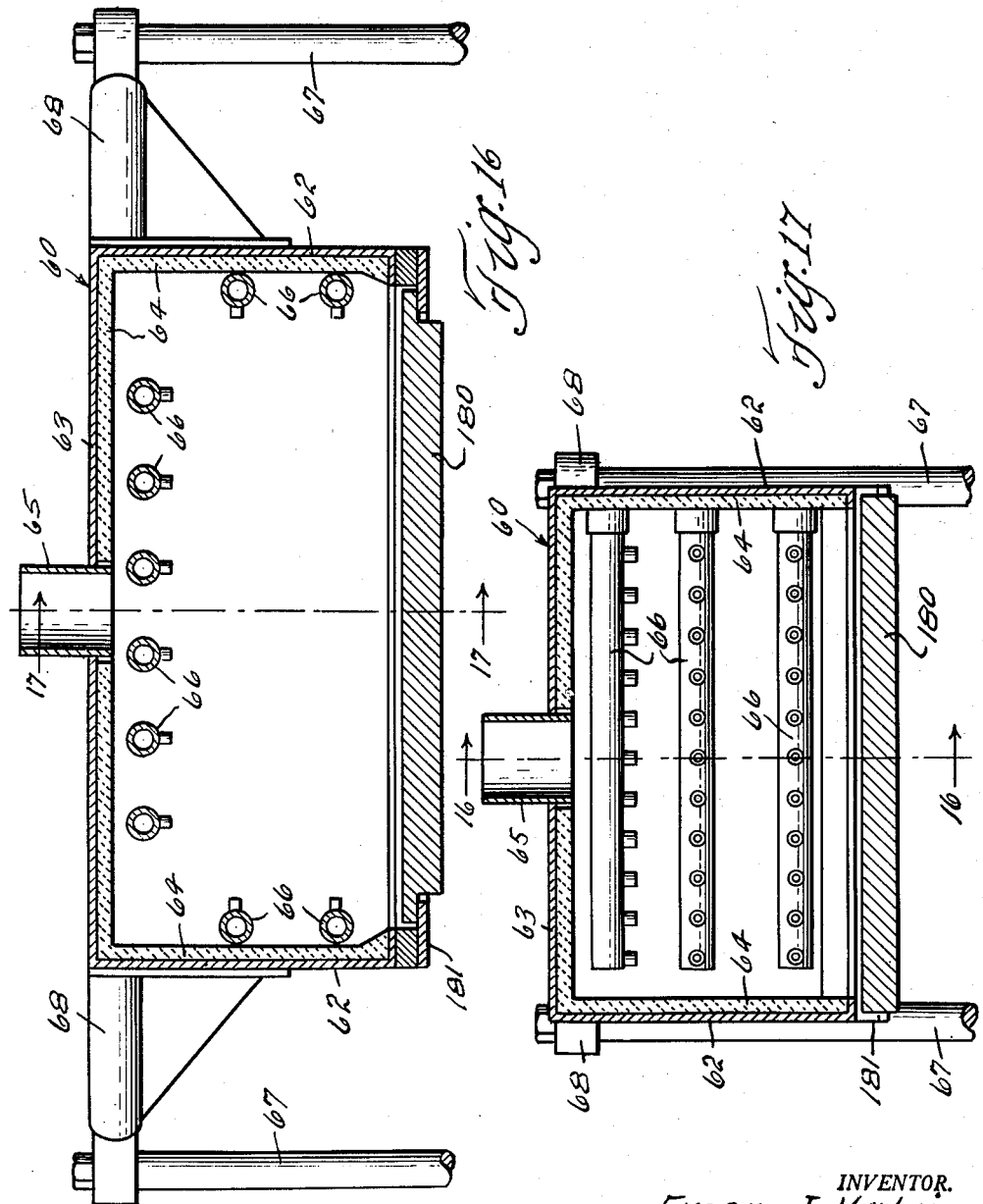

Jan. 13, 1959

E. I. VALYI 2,867,867

SHELL MOLDING MACHINE

Filed April 15, 1957

INVENTOR.
Emery I. Valyi
BY
Atty.

INVENTOR.
Emery I. Valyi

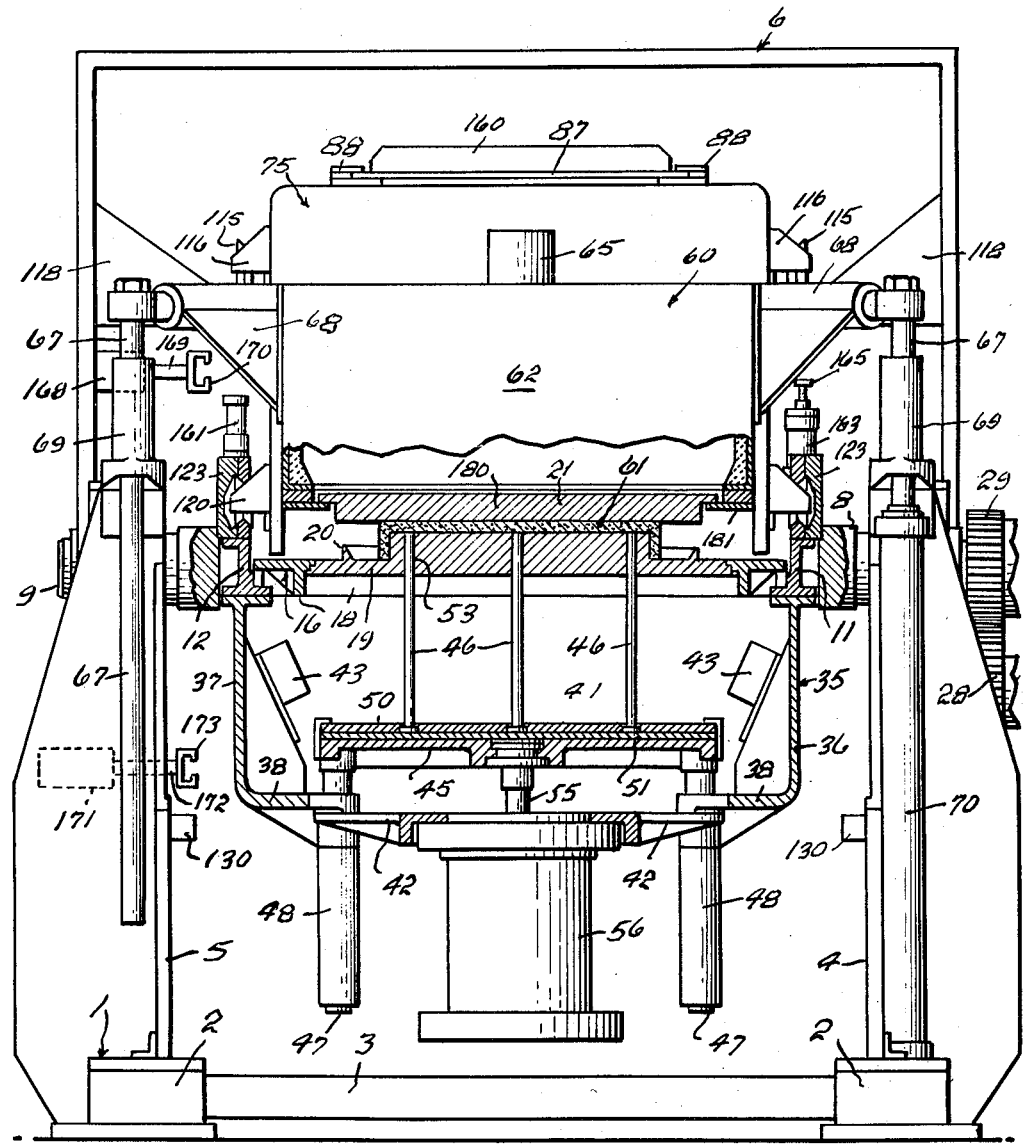

United States Patent Office 2,867,867
Patented Jan. 13, 1959

2,867,867

SHELL MOLDING MACHINE

Emery I. Valyi, New York, N. Y.

Application April 15, 1957, Serial No. 652,966

40 Claims. (Cl. 22—20)

This invention relates to an apparatus for producing foundry molds in shell form from a molding mixture comprising a refractory and bonding agent. The apparatus to which this invention relates is a modification and improvement of the mold forming machines disclosed in Patents No. 2,659,944 and No. 2,659,945 which were issued to me on November 24, 1953.

In producing shell molds with machines of this general character the molding mixture may comprise silica, alumina or zirconia sands or flour for the refractory, and phenol, melamine or urea formaldehyde resins for the bonding agent. In operation an excess of molding mixture is applied to a pre-heated pattern to a depth of several inches for from five to twenty seconds. During this time the heated pattern causes the contacting mixture to bond and solidify into a layer thus forming a partially cured shell having a substantially uniform thickness between one-eighth and one-half inches, which depends upon the temperature of the pattern and the time of contact. The excess unbonded molding mixture is then removed from the pattern and the partially cured shell upon the pattern subjected to the heat of a curing oven until the shell is further cured into a hard, rigid and strong condition. The completed mold shell is then stripped from the pattern. The pattern may be pre-heated to a temperature of from 350° to 600° F.; and the temperature of the curing oven may be between 500° F. and 900° F. both of which are dependent upon the type of mold shell being formed and the composition of the molding mixture used.

The apparatus of the present invention comprises generally, a pattern carriage to which a pattern is adapted to be removably secured by means of a pattern adapter, a sand box from and by which the molding mixture is deposited over the face of the pattern, a pattern heating oven, a mold shell curing oven, and stripping mechanism by which the mold shells are stripped from the pattern.

The pattern carriage consists of a rectangular frame having a pair of opposed aligned trunnions extending outwardly from opposite sides thereof by which the frame is rotatably supported, by and between a pair of suitable supports, for rotation about a horizontal axis between upright and inverted positions. The pattern heating oven is secured to the under side of the carriage frame, for rotation therewith, with the pattern which is secured by a pattern adapter to the top of the frame constituting the top wall of the oven, so that the heat of the oven is applied directly to the underside of the pattern.

The sand box is normally disposed in laterally spaced relation to the carriage at one side thereof and is supported by a pair of spaced longitudinally extending tracks on which the sand box is moved back and forth horizontally into and out of position over the carriage and a pattern mounted thereon. Cooperating means between the carriage and the sand box are provided by which the sand box is clamped to the carriage for rotation therewith.

The sand box is divided into upper and lower compartments by a set of louvers which are adapted to be opened and closed when the sand box is secured in position to the carriage; and the lower compartment of the sand box is provided with a pair of opposed vertically slidable doors, one at each side thereof, which are adapted to be opened and closed by means mounted on the carriage when the sand box is in position over the carriage. Means are also provided by which the doors are maintained in upper open position when the sand box is out of register with the carriage.

The curing oven which is open at the lower end thereof is reciprocally mounted above the carriage in vertically spaced alignment therewith for movement into and out of curing position over the carriage and around the pattern mounted on the carriage.

The stripping mechanism, which is also mounted upon the pattern carriage for rotation therewith, comprises an ejector plate, a plurality of ejector pins and a hydraulically actuated piston which is reciprocally mounted in a cylinder secured to the bottom wall of the pattern heating oven. The ejector plate is disposed within the pattern heating oven and is secured to the outer end of a piston rod carried by the actuating piston. The ejector pins are carried by the ejector plate and extend through complementary apertures in the pattern terminating flush with top surface of the pattern.

In operation a supply of molding mixture is placed in the upper compartment of the sand box, the louvers being closed, after which the sand box is moved into position over the carriage and clamped thereto. The doors of the lower compartment are then closed after which the louvers are opened thereby dumping the molding mixture in the upper compartment down into the lower compartment over the upper surface of a heating pattern mounted on the carriage. After a predetermined length of time, during which time the molding mixture in contact with the heated pattern bonds into a thin layer over the pattern, the carriage and sand box are rotated through at least 180° to inverted position. As the carriage and sand box are inverted the excess unbonded molding mixture falls back into the upper compartment (now the bottom compartment) leaving a partially cured mold shell on the pattern. The louvers are then closed and the carriage and sand box rotated back to upright position, after which the lower compartment doors are raised to open position and the sand box moved back to its normal laterally offset position at one side of the carriage.

After the sand box has been removed from the pattern carriage the curing oven is brought into curing position over and around the pattern with the partially cured mold shell thereon, and maintained in this position until the mold shell has been completely cured into a hard, rigid, strong shell-mold, after which the curing oven is returned to its normal position above the carriage. The completed shell-mold is then stripped from the pattern by the stripping mechanism. After the molding mixture in the upper compartment of the sand box has been replenished the operation just described is repeated for each shell-mold produced.

Shell-molds of various different sizes and configurations, within the maximum capacity of the apparatus, may be produced by the apparatus shown and described herein. In producing shell-mold of less than maximum size molding mixture would be applied to the entire upper surface of a pattern and adapter encompassed by the lower compartment of the sand box when the sand box louvers were opened to dump the molding mixture down from the upper compartment unless means are provided to restrict the application of molding mixture to only such portions of the pattern as are necessary to produce the desired shell-mold. Otherwise much molding mixture would be wasted due to it being partially bonded by contact with the heated unnecessary portions of the pattern and/or pattern adapter. To this end I provide a mask by which the unnecessary portions of the pattern and/or adapter are blanked off in such a manner that molding mixture can only be applied to the exposed portions of the pattern when the sand box louvers are opened. This mask is removably supported by and between the lower ends of the sand box doors for up and down movement therewith. When the sand box doors are lowered to closed position the mask will be brought down into position over and slightly above the portions of the pattern and adapter. Then when the sand box louvers are opened the molding mixture will be deposited on the upper surface of the mask which is disposed over the unnecessary portions of the pattern and adapter.

In the production of certain types of shell-molds it is desirable to smooth and flatten the upper rear surface of the shell-molds. For this purpose I provide a pressure plate which is removably mounted in the curing oven at the open lower end thereof. When the curing oven is lowered into curing position this pressure plate will contact and smooth the upper surface of a mold shell on the pattern, and the curing heat for the partially cured shell on the pattern will be transmitted to the shell through the pressure plate.

The principal object of the invention is to provide a single station machine for producing shell-molds of the character described, which is of simple construction, is relatively inexpensive to manufacture, and which will increase the production of and decrease the cost of producing shell-molds.

Another object of the invention is to provide in a machine of the aforesaid character means by which the excessive use of molding mixture is eliminated.

Another object of the invention is to provide a machine of the aforesaid character which is so constructed and arranged as to lend itself to fully automatic control of the different operations of the machine in producing shell-molds.

Having stated the principal objects of the invention other and more limited objects of the invention will be apparent from the following specification and the accompanying drawings forming a part thereof in which.

Figure 1:
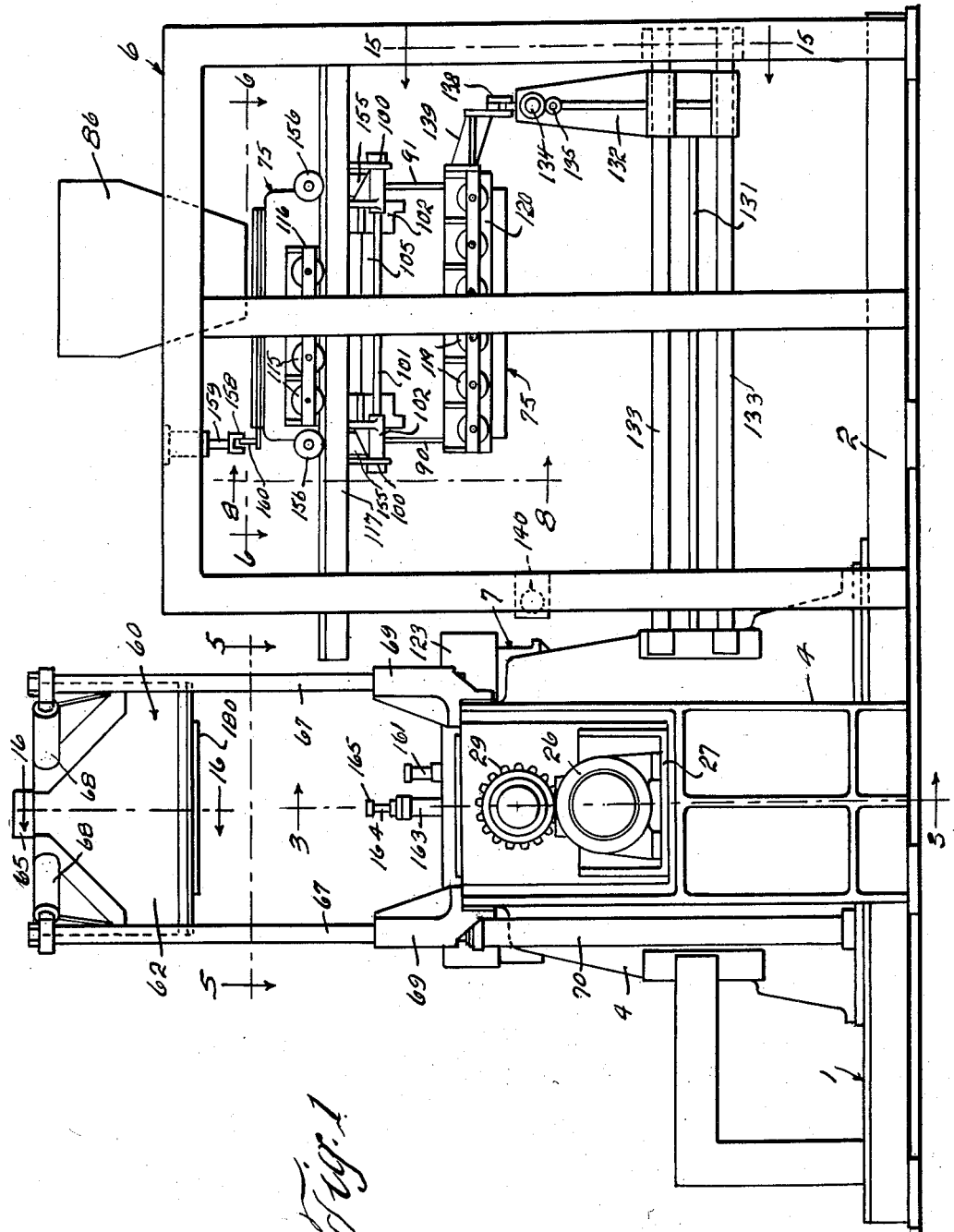
Fig. 1 is a side elevation of the presently preferred embodiment of a shell-mold forming machine constructed according to my invention.
Figure 2:
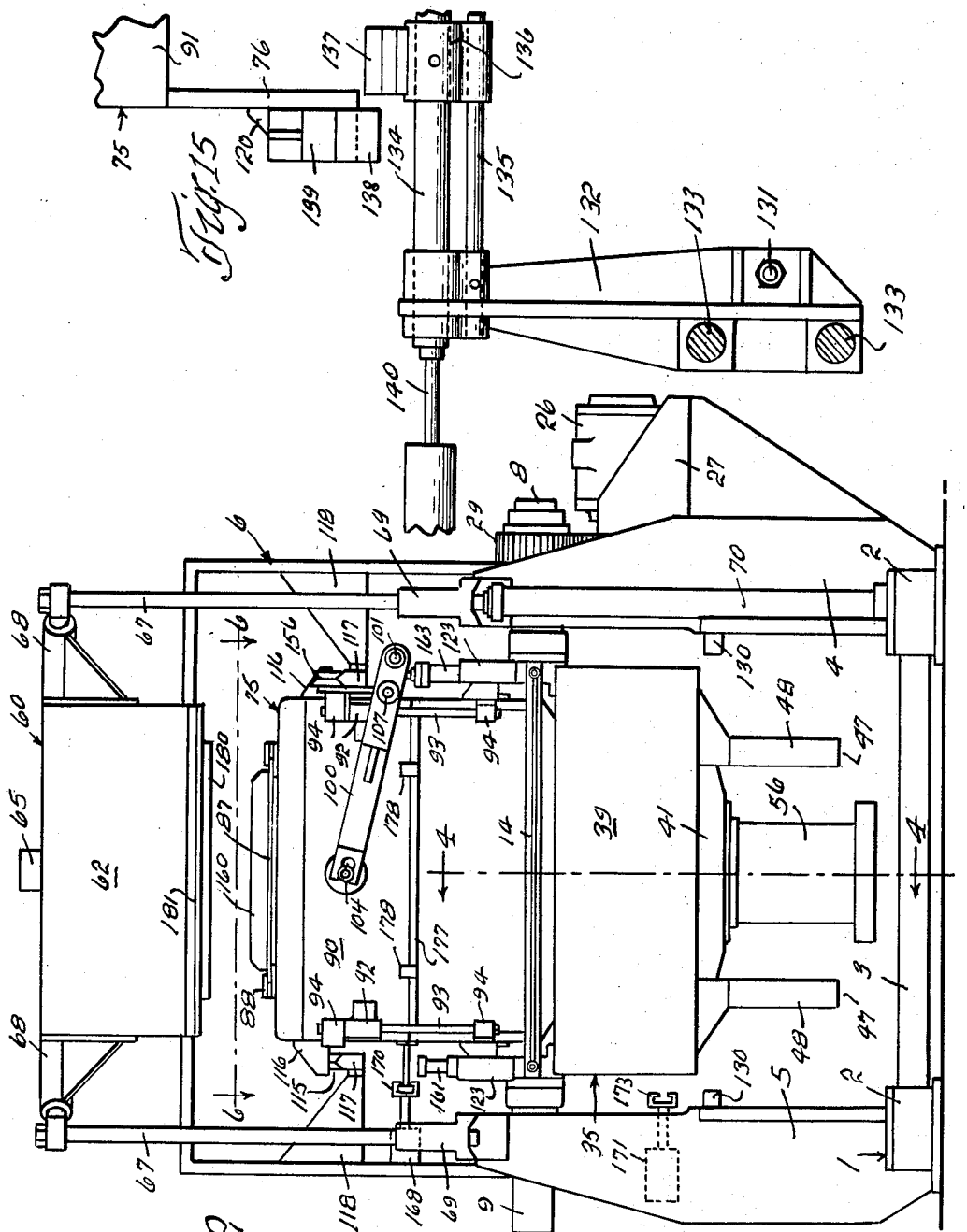
Fig. 2 is an end elevation thereof looking from the left of Fig. 1.
Figure 3:
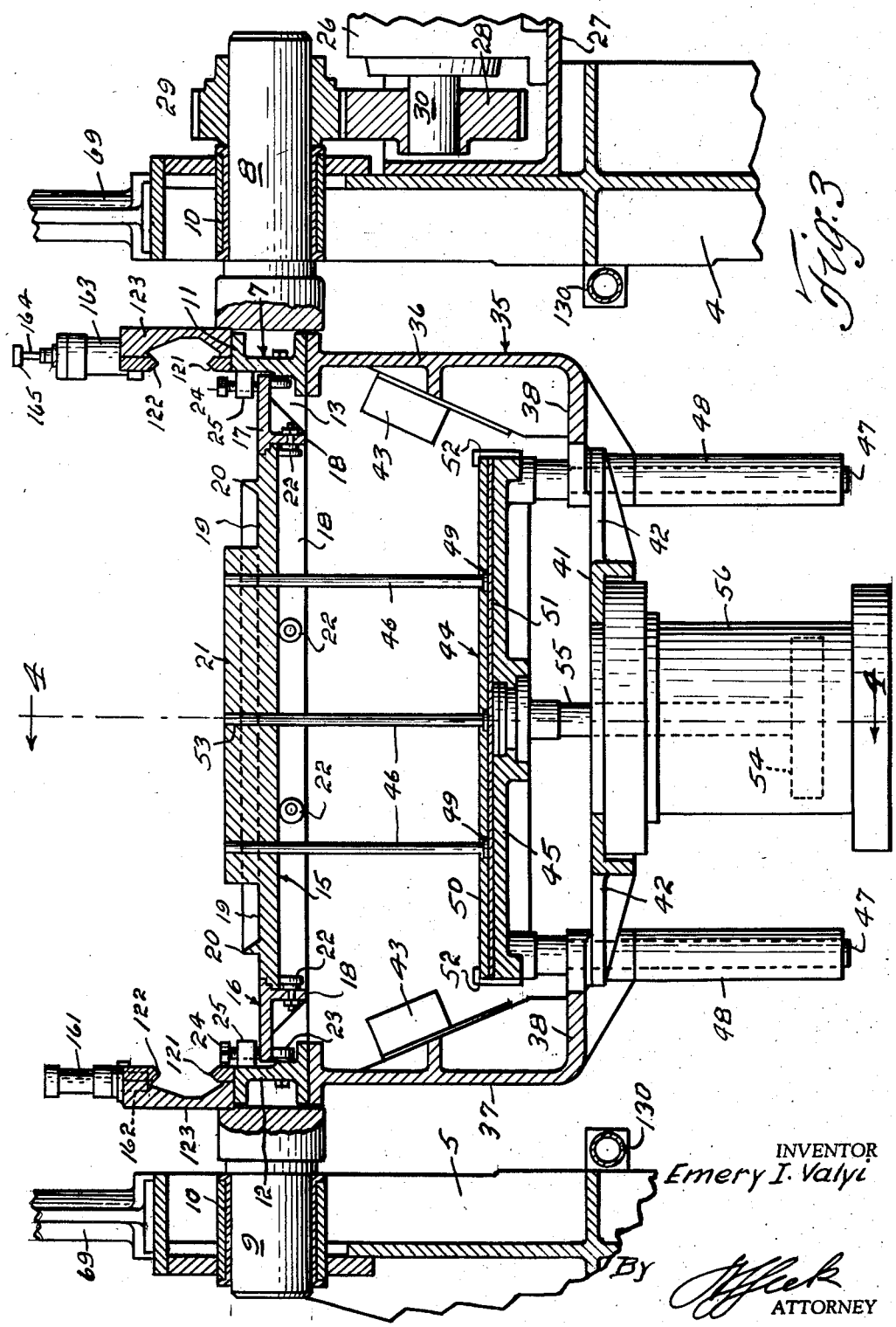
Fig. 3 is an enlarged transverse vertical section through the rotatably mounted pattern carriage and the pattern heating oven and mold stripping mechanism carried thereby and showing a pattern removably mounted in the carriage, the plane of the section being indicated by the lines 3—3 on Figs. 1 and 4.
Figure 4:
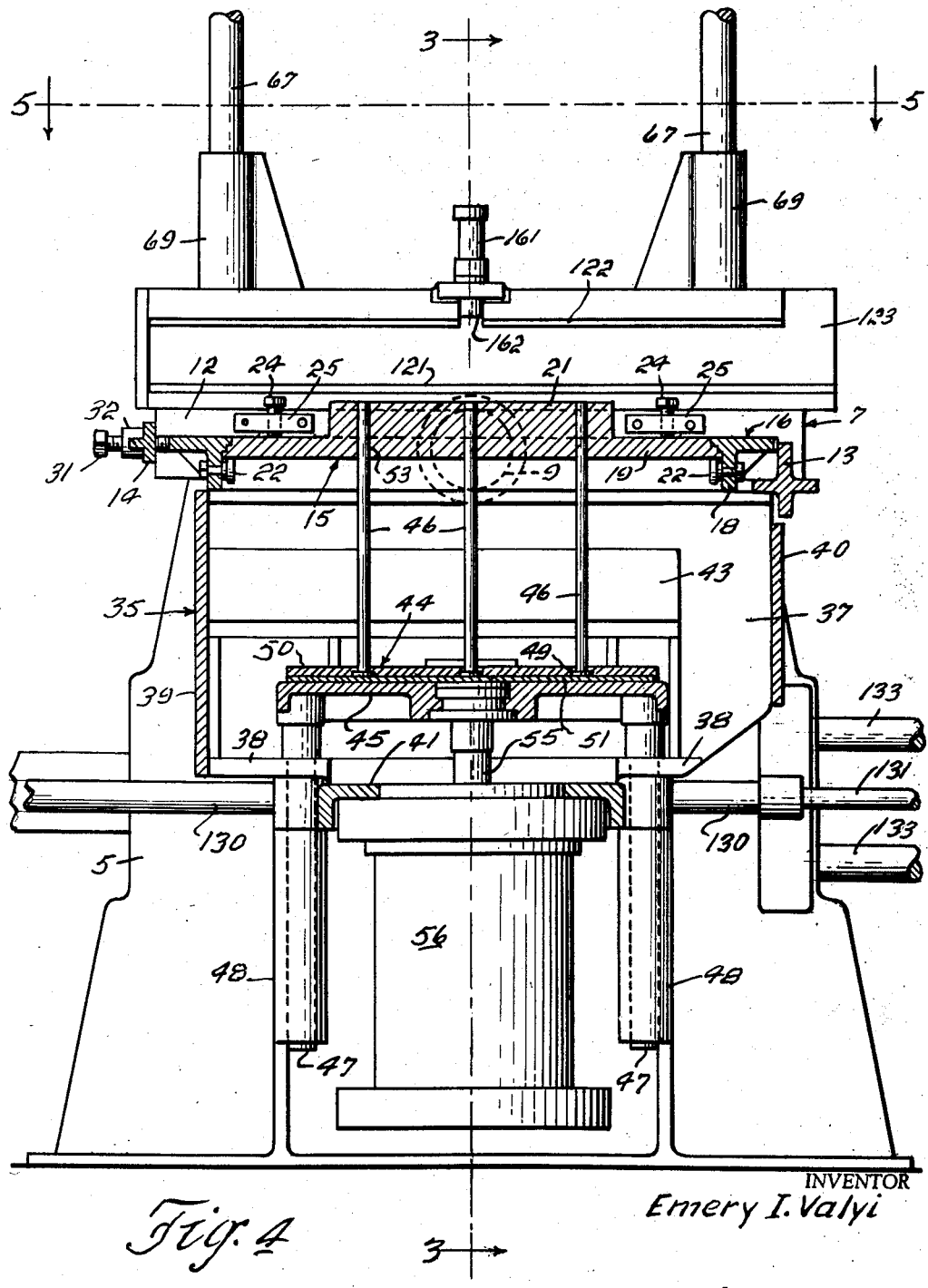
Fig. 4 is a longitudinal vertical section through the mechanisms shown in Fig. 3, the plane of the section being indicated by the lines 4—4 on Figs. 2 and 3.

Fig. 5 is a sectional plan view of the mechanisms shown in Figs. 3 and 4, the plane of the section being indicated by the lines 5—5 on Figs. 2 and 4;

Fig. 6 is a plan view as viewed from the lines 6—6 on Figs. 1 and 2 of the reciprocally mounted sand box by which molding mixture is applied to and removed from the face of a pattern mounted in the pattern carriage when the sand box and pattern carriage are in juxtaposition;

Fig. 7 is a side elevation of the sand box shown in Fig. 6 as viewed from the right of Fig. 6;

Fig. 8 is an end elevation of the sand box of Figs. 6 and 7 as viewed from the line 8—8 on Fig. 1;

Fig. 9 is a horizontal section taken on the line 9—9 of Fig. 8 when the sand box doors and the pattern mask carried thereby are in lowered closed position;

Fig. 10 is a transverse vertical section through the sand box taken substantially on the line 10—10 of Fig. 7;

Fig. 11 is a vertical section taken substantially on the line 11—11 of Fig. 10;

Fig. 12 is a detail horizontal section taken on the line 12—12 of Fig. 7, showing the detachable connection between the sand box and the shifting mechanism therefor;

Fig. 13 is an enlarged detail section showing the mechanism for holding the sand box doors open against gravity when the sand box is in normal retracted position, the plane of the section being indicated by the line 13—13 on Fig. 6;

Fig. 14 is a detail vertical sectional view taken substantially on the lines 14—14 on Figs. 10 and 12;

Fig. 15 is a detail view in elevation of the sand box shifting mechanism as viewed from the line 15—15 on Fig. 1, showing the connecting means between the sand box and the shifting mechanism in detached position.

Figure 18:
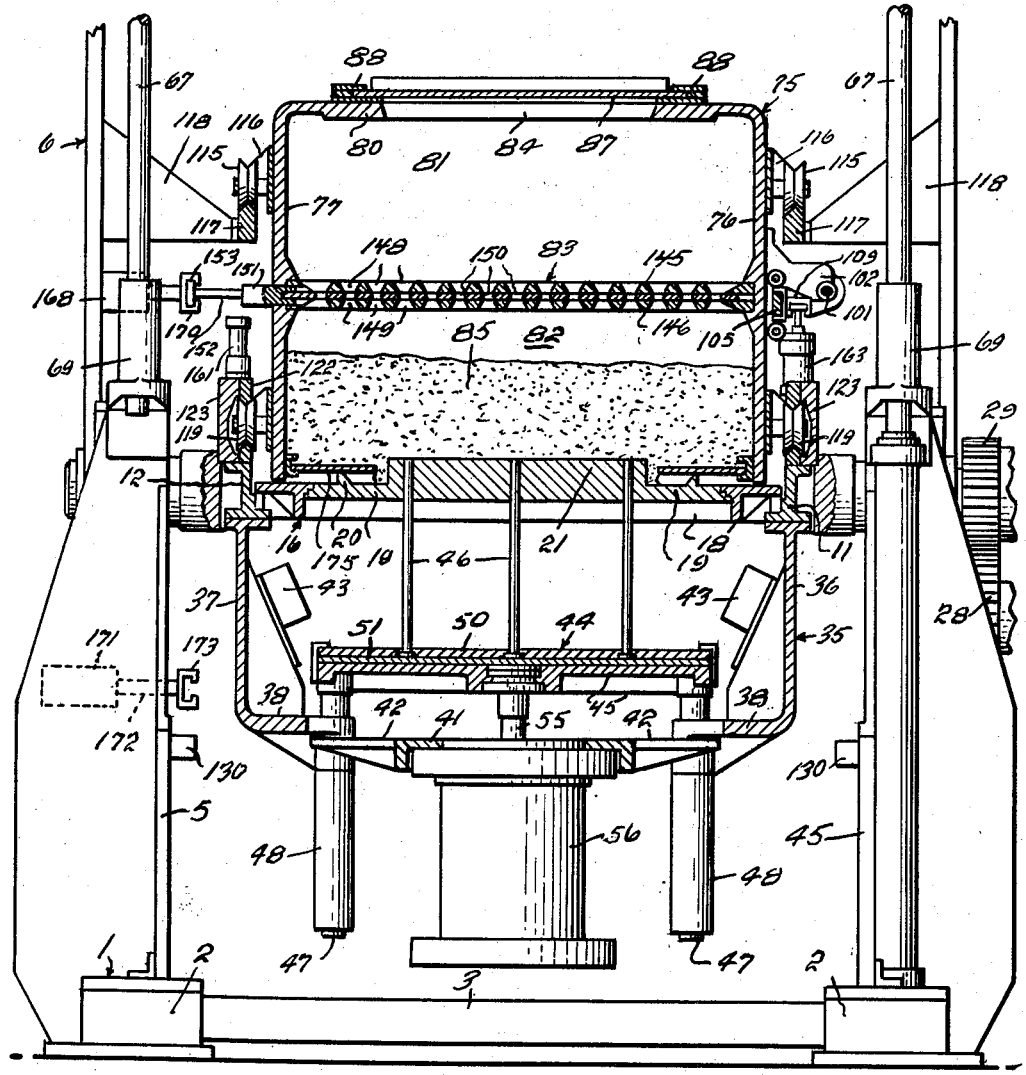
Figure 19:
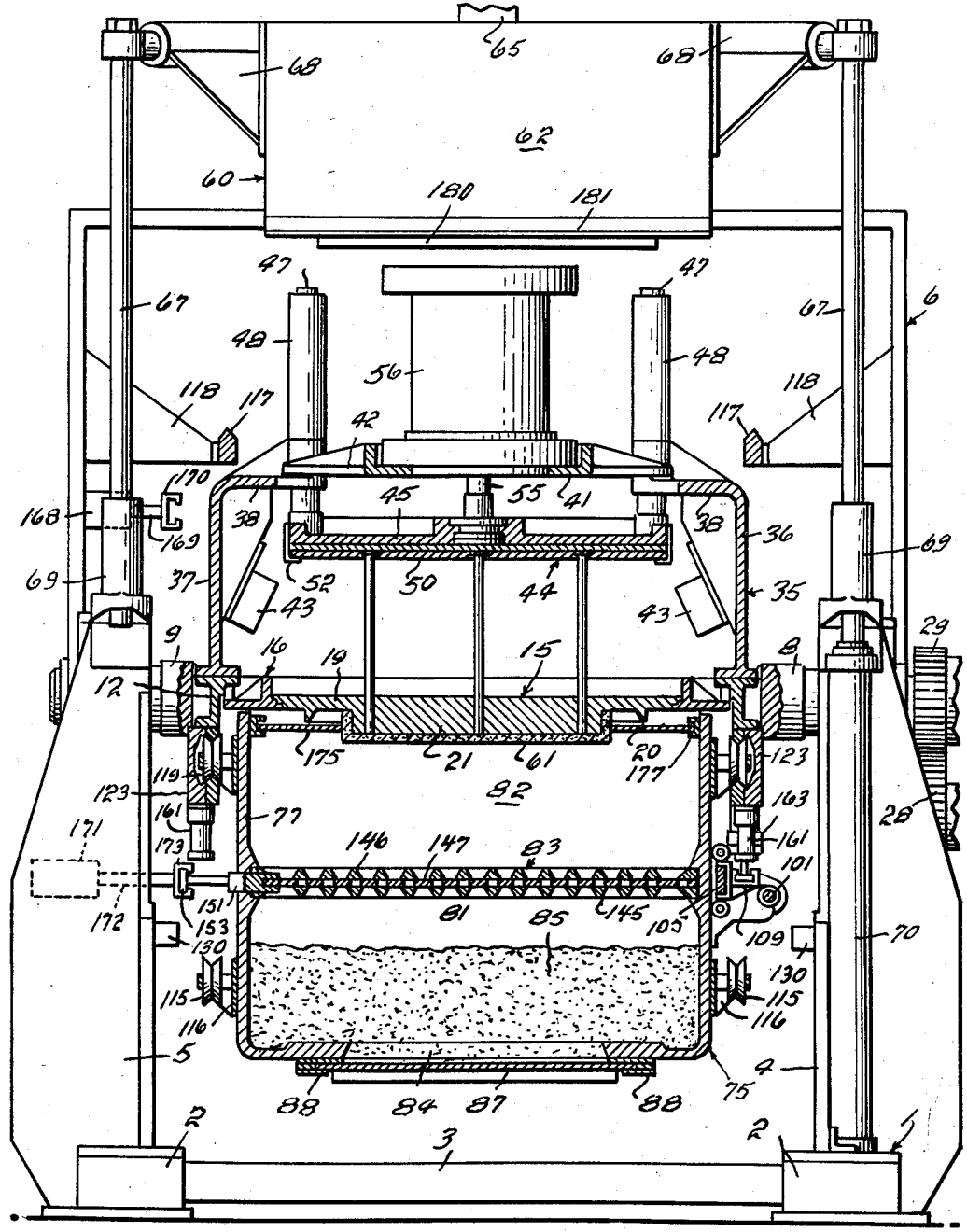

Fig. 16 is a transverse vertical section through the mold curing oven, the plane of the section being indicated by the lines 16—16 on Fig. 1 and 17;

Fig. 17 is a longitudinal vertical section through the mold curing oven taken at right angles to Fig. 16 as indicated by the line 17—17 on Fig. 16;

Fig. 18 is a transverse vertical sectional view, similar to Fig. 3, showing the sand box mounted on the pattern carriage over and around a pattern secured in the carriage, the sand box louvers having been opened to discharge the molding mixture from the upper compartment of the sand box down into the lower compartment thereof over the face of the pattern;

Fig. 19 is a view similar to Fig. 18 showing the pattern carriage, sand box and the various other parts secured to the carriage after they have been rotated to inverted position in order to return the excess unbonded molding mixture back to the upper compartment of the sand box and the sand box louvers having been closed preparatory to returning the carriage, sand box and other parts secured to the carriage back to upright position; and Fig. 20 is a view similar to Fig. 3 showing the mold curing oven moved down in position to complete the curing of a partially cured mold shell on the pattern.

Referring now to the drawings by reference characters the numeral 1 indicates generally a base comprising a pair of spaced parallel beams 2 which are connected together by a plurality of spaced parallel cross bars 3. Secured to and extending upwardly from the base 1 adjacent the forward end thereof are a pair opposed similar cast metal supports 4 and 5; and secured to the base 1 rearwardly of the supports 4 and 5 is a structural frame work generally indicated by the numeral 6.

Hereafter in the specification and claims, the left hand end of the machine as viewed in Fig. 1 will be referred to as the forward or leading end, and the right hand end thereof as the rear or trailing end; and the side of the machine shown in Fig. 1 will be referred to as the front side and the side opposite that shown in Fig. 1 will be referred to as the back side of the machine.

A pattern carriage generally indicated by the numeral 7 is rotatably supported by and between the supports 4 and 5 by means of axially aligned trunnions 8 and 9 which are secured to and extend outwardly from opposite sides of the carriage into suitable bearing 10 mounted in the supports 4 and 5. The pattern carriage comprises a U-shaped structural frame having the spaced parallel sides 11 and 12 which are connected together at the rear ends thereof by an end section 13. The open forward end of the frame is adapted to be closed by a cross bar 14 which is removably secured to the ends of the sides 11 and 12.

A pattern 15 is removably mounted in the pattern carriage 7 by means of a pattern adapter 16 which comprises a rectangular frame 17 having a smooth flat upper surface and a downwardly extending annular flange 18 adjacent the inner edge of the frame. The pattern 15, which comprises a base having an upwardly extending annular flange 20 which surrounds the mold forming section 21 of the pattern, is removably secured in the frame 17 by means of a plurality of clamping rollers 22 which are eccentrically mounted on the flange 18. The adapter 16, with the pattern 15 secured therein, is inserted into the pattern carriage through the open end of the carriage frame, when the bar 14 is removed, and is supported therein by a plurality of clamping rollers 23 which are rotatably mounted on the inner faces of the sides 11 and 12 of the carriage frame. The adapter is secured in fixed position in the carriage frame by a plurality of clamping screws 24 which are carried by bosses 25 which are secured to the inner faces of the sides 11 and 12 in vertically spaced relation to the clamping rollers 23 in order to permit the adapter to be inserted between the clamping rollers 23 and the clamping screws 24; and by screws 31 carried by bosses 32 on the bar 14.

The pattern carriage 7 and all mechanism carried thereby or secured thereto are adapted to be rotated back and forth in unison between upright and inverted positions by a hydraulic motor 26, which is mounted upon a bracket 27 secured to and extending outwardly from the support 4, and a pair of meshing gears 28 and 29 which are secured to the motor shaft 30 of the hydraulic motor and the trunnion 8 respectively.

The pattern 15 is heated to and maintained at the desired temperature by a pattern heating oven 35 which is permanently secured to the underside of the carriage 7. The oven 35 comprises the front and back side walls 36 and 37 which are secured to and extend downwardly from bottom of the carriage frame sides 11 and 12 and are turned inwardly at the lower ends thereof as indicated at 38. The side walls 36 and 37 are connected together by end walls 39 and 40, and a bottom plate 41 is connected to the inturned lower ends 38 of the side walls 36 and 37 by outwardly extending arms 42. The adapter 16 and pattern 15 carried thereby constitute the top wall of the *oven* 35. Suitable heating elements 43, which may be either gas or electric, are mounted within the oven 35 in position to directly heat the pattern 15.

A stripping mechanism 44 by which a completed mold shell is stripped from the pattern 15 is also carried by the pattern carriage 7. The stripping mechanism 44 comprises an ejector plate 45 and a plurality of ejector pins 46. The ejector plate 45 is reciprocally mounted in the heating oven 35 by four cylindrical rods 47 which are secured to each corner of the ejector plate 46 and extend downwardly therefrom, one at each corner thereof. The rods 47 are slidably mounted in sleeves 48 which are secured to and extend downwardly from the inturned ends 38 of the side walls 36 and 37. The stripping pins 46 are provided with heads 49 which seat in complementary recesses in a plate 50 and are held therein by a backing plate 51. The plates 50 and 51 are removably mounted on the ejector plate 45 by means of clips 52. The stripping pins 46 extend upwardly from the ejector plate 45 through complementary apertures 53 in the pattern 15 and terminate flush with the upper surface of the pattern 15. The ejector plate 45 and the ejector pins 46 carried thereby are adapted to be reciprocated by a hydraulically actuated piston 54 through a piston rod 55 by which the piston 54 is connected to the ejector plate 45. The piston 54 is reciprocally mounted in a hydraulic cylinder 56 which is permanently secured to the lower end of the oven bottom plate 41 and extends downwardly therefrom.

A curing oven 60 by which the curing of a partially cured mold shell 61 on the pattern 15 is completed is reciprocally mounted above the carriage 7 in vertically spaced alignment therewith. The curing oven 60 which is open at the lower end thereof, comprises the side walls 62 and the top wall 63 which are lined with suitable refractory material 64. The oven 60 is provided with a vent chimney 65 and has a plurality of heating elements 66 which as shown herein are gas burners but which if desired could be electric heating elements. The oven 60 is reciprocally supported above the carriage 7 by four downwardly extending cylindrical rods 67 which are secured to the oven 60 by bracket arms 68 and are slidably mounted in sleeves 69 secured to the upper ends of the supports 4 and 5. Two of the rods 67, which are diametrically opposite each other, are connected to hydraulically actuated pistons which are slidably mounted in elongated cylinders 70 and are operative to lower and raise the oven 60 into and out of curing position over a partially cured mold shell 61 on the pattern 15.

A sand box, generally indicated by the numeral 75, by which molding mixture is applied to the pattern 15 is normally disposed in laterally spaced relation to the carriage 7 at one side thereof, and is slidably supported for horizontal back and forth movement into and out of operative position between the pattern carriage 7 and the curing oven 60 over and surrounding a pattern 15 in the carriage 7. The sand box 75 comprises the front and back side walls 76 and 77, the end walls 78 and 79 and the top wall 80, and is divided into upper and lower compartments 81 and 82 by a louver mechanism 83 which is adapted to be opened and closed at predetermined times as will be described hereinafter. The top wall 80 is provided with a filling opening 84 through which the upper compartment 81 is supplied with molding mixture 85 from a hopper 86 when the sand box is in normal offset position with the louver mechanism 83 closed. The filling opening 84 is adapted to be closed by a door 87 which is slidably mounted in suitable guideways 88 secured to the upper surface of the top wall 80.

The end walls 78 and 79 terminate slightly below the louver mechanism 83, as indicated at 89, thus leaving the leading and trailing ends of the lower compartment open. In order to close these open ends when the sand box 75 is in operative position over the carriage 7 a pair of vertically slidable doors 90 and 91 are provided. The doors 90 and 91 are slidably supported against the outer surfaces of the end walls 78 and 79 by arms 92 which are secured to the doors 90 and 91 and are slidably mounted upon vertically extending rods 93 which are suitably secured to the sand box housing by brackets 94 at the upper and lower ends thereof. The doors 90 and 91 are adapted to be raised and lowered between closed and open positions by a pair of levers 100 each having one end thereof pivotally secured on a bar 101 which extends from end to end of the sand box 75 adjacent the front wall 76 and is mounted in brackets 102 which are secured to the front wall 75 and extend outwardly therefrom. The free ends of the levers 100 are provided with elongated slots 103 in which outwardly extending studs 104 secured to the doors 90 and 91 are received. The levers 100 are oscillated up and down in unison by a vertically reciprocal bar 105 which is connected to and extends between the levers 100 across the front wall 76 and is mounted in elongated slots 106 in the brackets 102. The ends of the bar 105 are connected to the levers 100 by studs 107 which extend through elongated slots 108 in the levers 100. An outwardly extending arm 109 through which the bar 105 is moved up and down is secured to the bar 105 intermediate the ends thereof. The arm 109 is provided with a downwardly opening T-slot 110 and four rollers 111 which bear against the outer face of the wall 76 as the arm 109 and with it the bar 105 are moved up and down. The rollers 111 in conjunction with the slots 106 are operative to prevent any rotation of the bar 105 about the axes of the studs 107 as the bar 105 and arm 109 are moved up and down.

The sand box 75 is provided with two similar sets of grooved rollers 115 which are carried by and secured to the front and back walls 76 and 77 of the sand box 75 adjacent the upper ends thereof by bearing brackets 116. The rollers 115 ride on a pair of spaced parallel horizontal tracks 117, which are mounted in fixed position in the structural frame 6 by brackets 118, and thereby support the sand box 75 for back and forth movement into and out of operative position over the carriage 7 and under the curing oven 60. The sand box 75 is also provided with two similar sets of grooved rollers 119 which are carried by and secured to the front and back walls 76 and 77 of the sand box 75 adjacent the lower ends thereof by bearing brackets 120. As the sand box 75 is moved into position over the carriage 7, by means to be described hereinafter, the rollers 115 ride off the tracks 117, the rollers 119 ride onto rails 121 and under opposed similar rails 122 which are carried by elongated rail supports 123 secured to the tops of the sides 11 and 12 of the pattern carriage frame. By reference to Fig. 1 it will be seen that the arrangement of the tracks 117 and rails 121—122 with respect to each other is such that the rollers 119 engage the tracks 121—122 before the rollers 115 leave the tracks 117 as the sand box 75 is moved into position over the carriage 7; and that the rollers 115 engage the tracks 117 before the rollers 119 leave the rails 121—122 as the sand box is moved back out of position over the carriage 7.

The sand box is moved back and forth by a pair of spaced parallel horizontally disposed hydraulic cylinder and piston assemblies 130 which are secured in fixed position to the opposed inner faces of the supports 4 and 5, and are connected by piston rods 131 to a pair of slides 132 each of which is slidably mounted on a pair of horizontal disposed rods 133, one pair of rods 133 being secured in fixed position along the front of the machine to and between the support 4 and the rear end of the structural frame 6, and the other pair of rods 133 being secured in fixed position along the back of the machine between the support 5 and the rear end of the frame 6. A rod 134 is slidably supported by and between the slides 132, and the slides 132 are provided with opposed axially aligned guide rods 135 which are rigidly secured to the slides 132. The rod 134 has a pair of spaced sleeves 136 rigidly secured thereon for movement therewith which are slidably mounted upon the guide rods 135 which prevent turning thereof. The sleeves 136 are provided with upwardly extending lugs 137 which are adapted to be engaged by downwardly projecting clevises 138 which are secured to the rear ends of brackets 139 which are connected to the sand box 75 through the bearing brackets 120. From this it will be seen that as the slides 132 are moved back and forth on the rods 133 by the piston rods 131 that the sand box 75 will also be moved back and forth between inoperative position as shown in Fig. 1 and operative position as shown in Figs. 18 and 19.

In order to permit the sand box 75 to rotate or roll over with the carriage 7 it is necessary to first disconnect the sand box shifting mechanism therefrom, after the sand box has been moved into position over the carriage 7, and to reconnect the shifting mechanism to the sand box after it has been returned from inverted position to upright position. For this purpose I provide a pair of opposed hydraulically actuated plungers 140 and 141 which are secured to opposite sides of the frame 6 in position to axially align with the slidably mounted rod 134 carried by the slides 132. After the sand box has been moved from its laterally offset position as shown in Fig. 1 into position over the carriage 7 as shown in Fig. 18 the plunger 140 is actuated to move the rod 134 and the sleeves 136 carried thereby from the position shown in Fig. 12 to the position shown in Fig. 15 and in dotted lines in Fig. 12, which removes the lugs 137 from the clevises 138 thereby disconnecting the sand box and the shifting mechanism therefor. After the sand box has been returned from inverted to upright position the plunger 141 is actuated to move the rod 134, sleeves 136 and lugs 137 back to initial position which reconnected the sand box and shifting mechanism. The sand box is then returned to its initial laterally offset position under the hopper 86.

The louver mechanism 83 by which the sand box is divided into the upper and lower compartments 81 and 82 comprises two opposed upper and lower sections 145 and 146, which are mounted in fixed position in the sand box, and a gate or slide 147 which is slidably mounted between the sections 145 and 146. The upper section 145 is provided with a plurality of equally spaced upwardly and outwardly flaring slots 148, and the lower section is provided with a like number of downwardly and outwardly flaring slots 149 in vertical alignment with the slots 148. The slide gate 147 is provided with a plurality of equally spaced slots 150 which are adapted to be brought into and out of register with the slots 148–149, thus providing communication between the upper and lower compartments 81 and 82, as shown in Fig. 18, or cutting off communication therebetween, as shown in Figs. 10 and 19. The slide gate 147 is adapted to be moved back and forth through a block 151 which is secured thereto and extends out through the back wall 77 of the sand box and is provided with a rod 152 having a rectangular head 153 secured to the free end thereof.

In order to maintain the doors 90 and 91 of the lower sand box compartment 82 open when the sand box is out of register with the carriage 7, I provide the bar 105 with two upwardly extending arms 155, one adjacent each end thereof. The upper ends of the arms 155 have grooved rollers 156 secured thereto which ride on the adjacent track 117 and thereby prevent lowering of the bar 105 to close the doors 90 and 91 until both rollers 156 have left the track 117.

As the sand box 75 is moved towards its normal offset position shown in Fig. 1 a bifurcated head 158 secured to the lower end of a hydraulically actuated plunger 159 grips and holds an upwardly extending plate 160 secured to the forward end of the sliding door 87 for the opening 84 into the upper sand box compartment. Further movement of the sand box to normal offset position effects the opening of the door 87 to permit refilling of the upper compartment 81 with molding mixture. The head 158 continues to grip and hold the plate 160 until the sand box is moved back towards the carriage 7 a sufficient distance to effect the closing of the door 87 at which time the head 158 is withdrawn from the plate 160.

The engagement of the rollers 119 by the opposed rails 121 and 122 when the sand box is in position over the carriage 7 prevents any radial movement of the sand box during roll over between upright and inverted positions but other means must be provided to prevent any lateral movement of the sand box during roll over. To this end I provide a pair of hydraulic cylinders 161, one of which is secured to the top of each of the rail supports 123 which are secured to the sides 11 and 12 of the carriage frame. Each of the cylinders 161 is provided with a retractable plunger 162 which is adapted to be projected down into engagement with one of the rails 121–122 when the sand box is in position over the carriage 7 and thereby prevent any lateral movement of the sand box during roll over.

In order to close and open the doors 90 and 91 of the lower sand box compartment 82 when the sand box is in position over the carriage 7 I provide a hydraulic cylinder 163 which is secured to the top of the rail support 123 along the front of the machine. The cylinder 163 has a retractable plunger 164 mounted therein which has a rectangular head 165 secured to the outer end thereof which is adapted to engage the T-slot 110 in the arm 109 when the sand box is in position over the carriage 7.

In order to move the slide gate 147 from the closed position shown in Fig. 10 to the open position shown in Fig. 18 when the sand box 75 is in upright position over the carriage 7 as shown in Fig. 18. I provide a hydraulic cylinder 168 having a retractable plunger 169 with a T-slotted head 170 secured to the outer end thereof in which the rectangular head 153 on the rod 152 which is connected to the slide gate 147 by the block 151 is adapted to be received when the sand box 75 is clamped in position to the carriage 7 as shown in Fig. 18; and in order to move the slide gate 147 from the open position shown in Fig. 18 back to closed position as shown in Figs. 10 and 19 when the carriage 7 and sand box 75 are in inverted position as shown in Fig. 19 I provide a hydraulic cylinder 171 having a retractable plunger 172 with a T-slotted head 173 secured to the outer end thereof in which the rectangular head 153 which is connected to the slide gate 147 by the rod 152 and block 151 is adapted to be received when the carriage 7 and sand box 75 are in inverted position as shown in Fig. 19.

As previously stated patterns 15 of various different sizes and configurations may be secured in the carriage 15 by the adapter 16 and unless some means were provided to prevent it molding mixture would be applied to the surface of the heated adapter and to unnecessary portions of the pattern 15 which would result in an excessive use of molding mixture since any holding mixture contacting the heated adapter and unnecessary portions of the pattern would be partially cured and have to be discarded. In order to prevent this excessive use of molding mixture I provide a mask 175 which is adapted to cover the adapter 16 and the unnecessary portions of the pattern 15 and thereby prevent molding mixture being applied to these surfaces when molding mixture is dumped from the upper compartment 81 of the sand box 75 into the lower compartment 82 thereof as will be hereinafter described.

The mask 175 comprises a flat somewhat flexible sheet of non-heat conductive material, having a centrally disposed aperture 176 up through which the mold shell forming portion 21 of the pattern 15 is adapted to extend as shown in Fig. 18. The contour of the aperture 176 is shaped in accordance with the pattern with which the mask is used, a separate mask being provided for each different pattern. The mask 175 is removably mounted, for slight floating movement, in a supporting frame 177 which is suitably secured, as by clips 178, to and between the bottoms of the doors 90 and 91 for movement therewith between open and closed positions.

With some types of shell-molds it is desirable to smooth and flatten the upper outer surface of the mold shell. For this purpose I provide a pressure plate 180 which is adapted to contact and bear upon the top of a partially cured mold shell 61 when the curing oven 60 is in lower curing position as shown in Fig. 20. The curing heat from the oven 60 is then transmitted to the mold shell 61 through the pressure plate 180. The pressure plate 180 is removably mounted in the lower open end of the oven 60 by any suitable means as indicated at 181.

The operation of the apparatus in producing a shell-mold will now be described, reference being had especially to Figs. 1, 10, 18, 19 and 20 of the drawings. When the sand box 75 is in its normal laterally spaced position at one side of the carriage 7 as shown in Fig. 1 the doors 90 and 91 for the lower sand box compartment 82 are in raised open position as shown in Figs. 2, 8 and 11. The door 87 for the filling opening 84 of the upper compartment 81 is in its retracted open position as shown in Figs. 6 and 11; and the louver mechanism 83 is closed as shown in Fig. 10. After a predetermined amount of molding mixture 85 is deposited in the upper compartment 81 of the sand box 75 from the hopper 86, as shown in Fig. 10, the sand box 75 is moved along the tracks 117 into position over the carriage 7 and pattern 15 therein, as shown in Fig. 18, by the hydraulic cylinders 130 through the piston rods 131, slides 132 and the connecting means between the slides 132 and sand box 75. During the initial movement of the sand box towards the carriage the door 87 is moved to position closing the filling opening 84 by the actuating mechanism 158—160 therefor. When the sand box is in position over the carriage the rollers 119 carried by the front and back walls of the sand box are disposed between the opposing sets of rails 121—122; the rectangular head 165 on the plunger 164 is engaged in the T-slot 110 in the arm 109; and the rectangular head 153 on the slide gate rod 152 is in engagement with the T-slotted head 170 secured to the end of the plunger 169, all as shown in Fig. 18. And the rod 134 of the sand box shifting mechanism is in axial alignment with the hydraulically actuated plungers 140 and 141. The plungers 162 are then protracted by the hydraulic cylinders 161 into engagement with the rollers 119 and/or the brackets 120 to prevent lateral shifting of the sand box during roll over, radial shifting thereof being prevented by the engagement of the rollers 119 between the opposed rails 121—122. The plunger 164 is then retracted by the hydraulic cylinder 163 to move the arm 109 and bar 105 downwardly thereby closing the doors 90 and 91, after which the plunger 140 is protracted to disconnect the sand box and shifting mechanism therefor as shown in Fig. 14. The closing of doors 90 and 91 carries the mask 175 down with them until it comes to rest on the annular flange 20 extending upwardly from the base 19 of the pattern and surrounding the mold forming section 21 thereof. In this position the mask 175 surrounds the shell forming section 21 of the pattern and covers the exposed portion of the adapter 16 within the lower sand box compartment 82, and that portion of the pattern base 19 not needed in forming the mold shell 61. The plunger 169 is then retracted to open the louver mechanism 83 which dumps the molding mixture 85 down from the upper compartment 81 into the lower compartment 82 over the face of the mask 175 and the exposed surface of the pattern as shown in Fig. 18.

After a predetermined length of time, during which the molding mixture in contact with the pattern bonds into a partially cured mold-shell 61 the carriage 7, sand box 75 and the various other mechanisms secured to or carried thereby are rotated by the hydraulic motor 26 from the upright position shown in Fig. 18 to the inverted position shown in Fig. 19. During this roll over, with the louver mechanism 83 open, the excess unbonded molding mixture 85 is dumped back from the lower compartment 82 into the upper compartment 81 leaving the partially cured mold-shell 61 on the pattern 15, as shown in Fig. 19. As the sand box 75 reaches fully inverted position the head 153 on the slide gate rod 152 is engaged by the T-slotted head 173 on the plunger 172 which is then protracted to close the louver mechanism 83, after which the carriage, sand box and other mechanisms carried thereby are returned to upright position with the excess unused molding mixture back in the upper compartment 81.

The plunger 141 is then protracted to reconnect the sand box and the shifting mechanism therefor, the plungers 162 are retracted to release the sand box from the carriage and the plunger 164 is protracted to open the doors 90 and 91, after which the sand box is returned to its initial laterally offset position. As the sand box approaches its initial position the door 87 is opened by the actuating mechanism 158—160 therefor to permit replenishing the molding mixture in the upper compartment 81 by the hopper 86.

After the sand box has been removed from the carriage the curing oven 60 is lowered into curing position as shown in Fig. 20, with the pressure plate bearing upon the upper outer surface of the mold shell 61. The curing oven is maintained in this position long enough for the partially cured mold shell to be cured into a hard, rigid and strong shell-mold after which the curing oven is returned to its initial position above the carriage. The completed shell-mold is then stripped from the pattern 15 by the stripping mechanism 44.

As previously stated the mounting of the pattern heating oven 35 and the stripping mechanism 44 upon the carriage 7 for roll over therewith serves a two-fold purpose. First the mounting of the pattern heating oven 35 on the carriage 7 below the pattern 15 enables the pattern to be maintained at any desired temperature, and second the pattern heating oven 35 and the stripping mechanism 44 counterbalance the sand box 75 during roll over between upright and inverted positions. Also the mounting of the stripping mechanism 44 on the carriage 7 permits stripping of the shell-mold upwardly from the pattern when the carriage and pattern are in upright position, downwardly from the pattern when the carriage and pattern are in inverted position, and outwardly from the pattern when the carriage and pattern are in any position between upright and inverted.

The operation thus described will be repeated for each shell-mold produced.

From the foregoing it will be apparent to those skilled in this art that I have provided a relatively simple and a very efficient shell-mold forming machine by which the objects of the invention are accomplished.

And it is to be understood that I am not limited to the specific construction shown and described herein as various modifications may be made therein within the spirit of the invention and the scope of the appended claims. For instance the mold curing oven may be disposed in laterally spaced relation with respect to said pattern carriage and be laterally moved into position over said carriage and a pattern secured thereon for completing the curing of a partially cured mold shell on said pattern, or the pattern carriage may be shifted laterally into position under the curing oven for completing the curing of a partially cured mold shell on the pattern. Also the sand box may be mounted in laterally spaced relation at one side of the carriage and the carriage be shifted from its normal position at one side of the sand box into position under the sand box for the application of molding mixture to the upper surface of said pattern, and then the carriage and the curing oven be brought into juxtaposition for the completion of the curing of a partially cured mold shell on the pattern. It will also be apparent that various other modifications may be made to the specific construction shown and described herein within the spirit of the invention and the scope of the appended claims.

I claim:

1. A shell mold forming machine of the character described comprising a pattern carriage adapted to have a pattern removably secured thereon, means by which said carriage is rotatably supported for rotation about a fixed horizontal axis, means by which said carriage is rotated back and forth between upright and inverted positions, a vertically reciprocal mold curing oven normally disposed in aligned vertically spaced relation above said carriage, a sand box adapted to contain a supply of molding mixture for application to the upper surface of said pattern, said sand box being normally disposed in laterally spaced relation to said carriage, means by which said sand box is moved into and out of position between said carriage and said mold curing oven and over a pattern mounted on said carriage, means by which said sand box is releasably clamped to said carriage for rotation therewith, means by which said curing oven is moved into and out of engagement with said carriage over and around a pattern mounted on said carriage, stripping mechanism mounted on said carriage by which a completed mold is stripped from said pattern, said sand box being divided into upper and lower compartments by a set of louvers, said upper compartment being adapted to contain a supply of molding mixture and said lower compartment being adapted to encompass a pattern mounted on said carriage, means by which said louvers are opened when said box is in an upright position over said carriage and pattern to thereby dump molding mixture from said upper compartment onto said pattern, means by which said louvers are closed after said sand box has been rotated to inverted position with said carriage to thereby trap in said upper compartment the unbonded molding mixture which was returned to said upper compartment by the inverting of said sand box, the leading and trailing ends of the lower compartment of said sand box being provided with a pair of vertically slidable doors, and means by which said doors are maintained in lower closed position when said sand box is in engagement with said carriage and in upper oven position when said sand box is disposed in laterally spaced relation to said carriage.

2. A shell-mold forming machine as defined in claim 1 in which a mask is carried by and between said doors adjacent the lower ends thereof for up and down movement with said doors, said mask being operative to blank off portions of said pattern and thereby prevent molding mixture being dumped onto said portions upon the opening of said louvers.

3. A shell-mold forming machine as defined in claim 2 in which a pattern heating oven is mounted on said carriage in position to heat a pattern secured on said carriage.

4. A shell-mold forming machine as defined in claim 3 in which a pressure plate, which is adapted to contact a partially cured mold on a pattern when said oven is in lowered curing position, is removably mounted in the lower open end of said curing oven.

5. A shell-mold forming machine as defined in claim 2 in which a pressure plate, which is adapted to contact a partially cured mold on a pattern when said oven is in lowered curing position, is removably mounted in the lower open end of said curing oven.

6. A shell mold forming machine of the character described comprising a pattern carriage adapted to have a pattern removably secured thereon, means by which said carriage is rotatably supported for rotation about a fixed horizontal axis, means by which said carriage is rotated back and forth between upright and inverted positions, a vertically reciprocal mold curing oven normally disposed in aligned vertically spaced relation above said carriage, a sand box adapted to contain a supply of molding mixture for application to the upper surface of said pattern, said sand box being normally disposed in laterally spaced relation to said carriage, means by which said sand box is moved into and out of position between said carriage and said mold curing oven and over a pattern mounted on said carriage, means by which said sand box is releasably clamped to said carriage for rotation therewith, means by which said curing oven is moved into and out of engagement with said carriage over and around a pattern mounted on said carriage, stripping mechanism mounted on said carriage by which a completed mold is stripped from said pattern, said sand box being divided into upper and lower compartments by a set of louvers, said upper compartment being adapted to contain a supply of molding mixture and said lower compartment being adapted to encompass a pattern mounted on said carriage, means by which said louvers are opened when said box is in an upright position over said carriage and pattern to thereby dump molding mixture from said upper compartment onto said pattern, means by which said louvers are closed after said sand box has been rotated to inverted position with said carriage to thereby trap in said upper compartment the unbonded molding mixture which was returned to said upper compartment by the inverting of said sand box, the leading ends of the lower compartment of said sand box being provided with a vertically slidable door, and means by which said door is maintained in lower closed position when said sand box is in engagement with said carriage and in upper open position when said sand box is disposed in laterally spaced relation to said carriage, said door being operative when in upper position to permit said sand box to clear a pattern on said carriage as said sand box is moved into and out of position over said carriage and pattern.

7. A shell-mold forming machine as defined in claim 6 in which a pattern heating oven is mounted on said carriage in position to heat a pattern secured on said carriage.

8. A shell-mold forming machine as defined in claim 7 in which a pressure plate, which is adapted to contact a partially cured mold on a pattern when said oven is in lowered curing position, is removably mounted in the lower end of said curing oven.

9. A shell-mold forming machine of the character described comprising a pattern carriage which is rotatably mounted for rotation about a horizontal axis and is adapted to have a pattern removably secured thereon, means by which said pattern carriage is rotated back and forth between upright and inverted positions, a sand box which is normally disposed in laterally spaced relation to said carriage and is adapted to contain a supply of molding mixture for application to the upper surface of said pattern, means supporting said sand box for movement into and out of position over said carriage and a pattern carried thereby and means by which said sand box is reciprocated back and forth, means releasably clamping said sand box to said carriage for rotation therewith between upright and inverted positions, a mold curing oven spaced from said carriage, means by which said carriage and said curing oven are brought into juxtaposition with said curing oven disposed over said carriage in position to complete the curing of a partially cured mold shell on a pattern secured to said carriage, and means by which a completed shell-mold is stripped from said pattern.

10. A shell-mold forming machine as defined in claim 9 in which a pattern heating oven is secured to said pattern carriage in position to heat a pattern mounted upon said carriage.

11. A shell-mold forming machine as defined in claim 10 in which the said mold stripping mechanism is also mounted upon said pattern carriage for rotation therewith.

12. A shell-mold forming machine as defined in claim 9 in which said mold stripping means is also mounted upon said carriage for rotation therewith.

13. A shell-mold forming machine as defined in claim 9 in which a pressure plate which is adapted to contact a partially cured mold shell on said pattern when said curing oven and said carriage are in juxtaposition, is removably mounted in the lower open end of said curing oven.

14. A shell-mold forming machine as defined in claim 9 in which said sand box is divided into upper and lower compartments by a set of louvers, said upper compartment being adapted to contain a supply of molding mixture and said lower compartment being adapted to encompass a pattern mounted on said carriage, means by which said louvers are opened when said sand box is in upright position over said carriage and pattern to thereby dump molding mixture from said upper compartment onto said pattern, and means by which said louvers are closed after said sand box has been rotated to inverted position with said carriage to thereby trap in said upper compartment the unbonded molding mixture which was returned to said upper compartment by the inverting of said sand box.

15. A shell-mold forming machine as defined in claim 14 in which the leading and trailing ends of the lower compartment of said sand box are provided with a pair of vertically slidable doors, and in which means are provided by which said doors are maintained in lower closed position when said sand box is in engagement with said carriage and in upper open position when said sand box is disposed in laterally spaced relation to said carriage.

16. A shell-mold forming machine as defined in claim 15 in which a mask is carried by and between said doors adjacent the lower ends thereof for up and down movement with said doors, said mask being operative to blank off portions of said pattern and thereby prevent molding mixture being dumped onto said portions upon the opening of said louvers.

17. A shell-mold forming machine as defined in claim 16 in which a pattern heating oven is mounted on said carriage in position to heat a pattern secured on said carriage.

18. A shell-mold forming machine as defined in claim 17 in which a pressure plate, which is adapted to contact a partially cured mold on a pattern when said oven, said carriage and said pattern are in juxtaposition, is removably mounted in the lower open end of said curing oven.

19. A shell mold forming machine of the character described comprising a pattern carriage which is rotatably mounted for rotation about a horizontal axis and is adapted to have a pattern removably secured thereon, means by which said pattern carriage is rotated back and forth between upright and inverted positions, a sand box which is normally disposed in laterally spaced relation to said carriage and is adapted to contain a supply of molding mixture for application to the upper surface of said pattern, means supporting said sand box for movement into and out of position over said carriage and a pattern carried thereby, means by which said sand box is reciprocated back and forth, means releasably clamping said sand box to said carriage for rotation therewith between upright and inverted positions, a mold curing oven spaced from said carriage, means by which said carriage and said curing oven are brought into juxtaposition with said curing oven disposed over said carriage in position to complete the curing of a partially cured mold shell on a pattern secured to said carriage, means by which a completed shell mold is stripped from said pattern, said sand box being divided into upper and lower compartments by a set of louvers, said upper compartment being adapted to contain a supply of molding mixture and said lower compartment being adapted to encompass a pattern mounted on said carriage, means by which said louvers are opened when said sand box is in upright position over said carriage and pattern to thereby dump molding mixture from said upper compartment onto said pattern, and means by which said louvers are closed after said sand box has been rotated to inverted position with said carriage to thereby trap in said upper compartment the unbonded molding mixture which was returned to said upper compartment by the inverting of said sand box, the leading and trailing ends of the lower compartment of said sand box being provided with a pair of vertically slidable doors, means by which said doors are maintained in lower closed position when said sand box is in engagement with said carriage and in upper open position when said sand box is disposed in laterally spaced relation to said carriage, a mask carried by and between said doors adjacent the lower ends thereof for up and down movement with said doors, said mask being operative to blank off portions of said pattern and thereby prevent molding mixtures being dumped onto said portions upon the opening of said louvers and a pressure plate adapted to contact a partially cured mold on a pattern when said oven, said carriage and said pattern are in juxtaposition removably mounted in the lower open end of said curing oven.

20. A shell-mold forming machine of the character described comprising a pattern carriage which is rotatably mounted for rotation about a horizontal axis and is adapted to have a pattern removably secured thereon, means by which said pattern carriage is rotated back and forth between upright and inverted positions, a sand box which is normally disposed in laterally spaced relation to said carriage and is adapted to contain a supply of molding mixture for application to the upper surface of said pattern, means supporting said sand box for movement into and out of position over said carriage and a pattern carried thereby, means by which said sand box is reciprocated back and forth, means releasably clamping said sand box to said carriage for rotation therewith between upright and inverted positions, a mold curing oven spaced from said carriage, means by which said carriage and said curing oven are brought into juxtaposition with said curing oven disposed over said carriage in position to complete the curing of a partially cured mold shell on a pattern secured to said carriage, means by which a completed shell mold is stripped from said pattern, said sand box being divided into upper and lower compartments by a set of louvers, said upper compartment being adapted to contain a supply of molding mixture and said lower compartment being adapted to encompass a pattern mounted on said carriage, means by which said louvers are opened when said sand box is in upright position over said carriage and pattern to thereby dump molding mixture from said upper compartment onto said pattern, means by which said louvers are closed after said sand box has been rotated to inverted position with said carriage to thereby trap in said upper compartment the unbonded molding mixture which was returned to said upper compartment by the inverting of said sand box, the leading end of the lower compartment of said sand box being provided with a vertically slidable door, and means by which said door is maintained in lower closed position when said sand box is in engagement with said carriage and in upper open position when said sand box is disposed in laterally spaced relation to said carriage, said door being operative when in upper open position to permit said sand box to clear a pattern on said carriage as said sand box is moved into and out of position over said carriage and pattern.

21. A shell-mold forming machine as defined in claim 20 in which a pattern heating oven is mounted on said carriage in position to heat a pattern secured on said carriage.

22. A shell-mold forming machine as defined in claim 21 in which a pressure plate, which is adapted to contact a partially cured mold on a pattern when said oven, said carriage and said pattern are in juxtaposition, is removably mounted in the lower open end of said curing oven.

23. A shell-mold forming machine of the character described comprising a movably supported pattern carriage adapted to have a pattern removably secured thereon, means by which said pattern is heated, a sand box which is normally disposed in laterally spaced relation to said carriage and is adapted to contain a supply of molding mixture for application to the upper face of said pattern, means supporting said sand box for reciprocating lateral movement into and out of position over said carriage and a pattern secured thereon and means by which said sand box is reciprocated back and forth, means incorporated in said sand box by which an excess amount of molding mixture is deposited over the face of a heated pattern mounted on said carriage when said sand box is in position over said carriage and pattern, means by which the excess unbonded molding mixture is removed from said pattern after said molding mixture has been disposed over said pattern for a predetermined length of time thereby leaving a partially cured mold shell on said pattern, a curing oven by which the curing of said partially cured mold shell is completed, means by which said curing oven and said carriage are brought into juxtaposition for completing the curing of the said partially cured mold shell on the said pattern, stripping mechanism by which a completed mold shell is stripped from said pattern, said sand box being divided into upper and lower compartments by a set of louvers, said upper compartment being adapted to contain a supply of molding mixture and said lower compartment being adapted to encompass a pattern mounted on said carriage, means by which said louvers are opened when said box is in upright position over said carriage and pattern to thereby dump molding mixture from said upper compartment onto said pattern, the leading and trailing ends of the lower compartment of said sand box being provided with a pair of vertically slidable doors, and means by which said doors are maintained in lower closed position when said sand box is disposed over said carriage and in upper open position when said sand box is disposed in laterally spaced relation to said carriage.

24. A shell-mold forming machine of the character described comprising a movably supported pattern carriage adapted to have a pattern removably secured thereon, means by which said pattern is heated, a sand box which is normally disposed in laterally spaced relation to said carriage and is adapted to contain a supply of molding mixture for application to the upper face of said pattern, means supporting said sand box for reciprocating lateral movement into and out of position over said carriage and a pattern secured thereon, means by which said sand box is reciprocated back and forth, means incorporated in said sand box by which an excess amount of molding mixture is deposited over the face of a heated pattern mounted on said carriage when said sand box is in position over said carriage and pattern, means by which the excess unbonded molding mixture is removed from said pattern after said molding mixture has been disposed over said pattern for a predetermined length of time thereby leaving a partially cured mold shell on said pattern, a curing oven by which the curing of said partially cured mold shell is completed, means by which said curing oven and said carriage are brought into juxtaposition for completing the curing of the said partially cured mold shell on the said pattern, stripping mechanism by which a completed mold shell is stripped from said pattern, said sand box being divided into upper and lower compartments by a set of louvers, said upper compartment being adapted to contain a supply of molding mixture and said lower compartment being adapted to encompass a pattern mounted on said carriage, means by which said louvers are opened when said box is in upright position over said carriage and pattern to thereby dump molding mixture from said upper compartment onto said pattern, a mask carried by and between said doors adjacent the lower ends thereof for up and down movement with said doors, said mask being operative to blank off portions of said pattern and thereby prevent molding mixture being dumped onto said portions upon the opening of said louvers.

25. A shell mold forming machine of the character described comprising a movably supported pattern carriage adapted to have a pattern removably secured thereon, means by which said pattern is heated, a sand box which is normally disposed in laterally spaced relation to said carriage and is adapted to contain a supply of molding mixture for application to the upper face of said pattern, means supporting said sand box for reciprocating lateral movement into and out of position over said carriage and a pattern secured thereon, means incorporated in said sand box by which an excess amount of molding mixture is deposited over the face of a heated pattern mounted on said carriage when said sand box is in position over said carriage and pattern, means by which the excess unbonded molding mixture is removed from said pattern after said molding mixture has been disposed over said pattern for a predetermined length of time thereby leaving a partially cured mold shell on said pattern, a curing oven by which the curing of said partially cured mold shell is completed, means by which said curing oven and said carriage are brought into juxtaposition for completing the curing of said partially cured mold shell on the said pattern, stripping mechanism by which a completed mold shell is stripped from said pattern, said sand box being divided into upper and lower compartments by a set of louvers, said upper compartment being adapted to contain a supply of molding mixture and said lower compartment being adapted to encompass a pattern mounted on said carriage, means by which said louvers are opened when said box is in an upright position over said carriage and pattern to thereby dump molding mixture from said upper compartment onto said pattern, the leading end of the lower compartment of said sand box being provided with a vertically slidable door, and means by which said door is maintained in lower closed position when said sand box is in engagement with said carriage and in upper open position when said sand box is disposed in laterally spaced relation to said carriage, said door being operative when in upper open position to permit said sand box to clear a pattern on said carriage as said sand box is moved into and out of position over said carriage and pattern.

26. A shell-mold forming machine of the character described comprising a pattern carriage which is rotatably supported for rotation about a horizontal axis and is adapted to have a pattern removably secured thereon, means by which said carriage is rotated back and forth between upright and inverted positions, pattern heating means mounted on said carriage for rotation therewith in position to apply heat to the under side of a pattern secured on said carriage, a sand box which is adapted to contain a supply of molding mixture for application to the upper surface of said pattern, a pair of spaced parallel similar rails secured to the upper surface of said carriage one adjacent each side thereof, a pair of spaced similar longitudinally extending parallel tracks mounted in fixed position adjacent one end of said carriage in vertically spaced relation to said rails, an upper set of rollers secured to each side of said sand box by which said sand box is supported on said tracks for lateral movement into and out of position over said carriage and a pattern secured thereon, actuating means by which said sand box is moved back and forth on said tracks, a lower set of rollers secured to each side of said sand box in position to engage and support said sand box on said rails when said sand box is in position over said carriage, means by which said sand box is secured in fixed position to said carriage for rotation therewith between inverted and upright positions, means by which said sand box is disconnected from said actuating means when said sand box is secured to said carriage to thereby permit said sand box to rotate with said carriage, a mold curing oven which is normally spaced from said carriage, means by which said curing oven and said carriage are brought into juxta-position to complete the curing of a partially cured mold shell on said pattern, and stripping mechanism by which a completed shell-mold is stripped from said pattern secured to said carriage for rotation therewith.

27. A shell-mold forming machine as defined in claim 26 in which said sand box is divided into upper and lower compartments by a set of louvers, said upper compartment being adapted to contain a supply of molding mixture and said lower compartment being adapted to encompass a pattern mounted on said carriage, means by which said louvers are opened when said box is in an upright position over said carriage and pattern to thereby dump molding mixture from said upper compartment onto said pattern, and means by which said louvers are closed after said sand box has been rotated to inverted position with said carriage to thereby trap in said upper compartment the unbonded molding mixture which was returned to said upper compartment by the inverting of said sand box.

28. A shell-mold forming machine as defined in claim 27 in which the leading and trailing ends of the lower compartment of said sand box are provided with a pair of vertically slidable doors, and means are provided by which said doors are maintained in lower closed position when said sand box is in engagement with said carriage and in upper open position when said sand box is disposed in laterally spaced relation to said carriage.

29. A shell-mold forming machine as defined in claim 28 in which a mask is carried by and between said doors adjacent the lower ends thereof for up and down movement with said doors, said mask being operative to blank off portions of said pattern and thereby prevent molding mixture being dumped onto said portions upon the opening of said louvers.

30. A shell mold forming machine of the character described comprising a pattern carriage which is rotatably supported for rotation about a horizontal axis and is adapted to have a pattern removably secured thereon, means by which said carriage is rotated back and forth between upright and inverted positions, pattern heating means mounted on said carriage for rotation therewith in position to apply heat to the underside of a pattern secured on said carriage, a sand box which is adapted to contain a supply of molding mixture for application to the upper surface of said pattern, a pair of spaced parallel similar rails secured to the upper surface of said carriage one adjacent each side thereof, a pair of spaced similar longitudinally extending parallel tracks mounted in fixed position adjacent one end of said carriage in vertically spaced relation to said rails, an upper set of rollers secured to each side of said sand box by which said sand box is supported on said tracks for lateral movement into and out of position over said carriage and a pattern secured thereon, actuating means by which said sand box is moved back and forth on said tracks, a lower set of rollers secured to each side of said sand box in position to engage and support said sand box on said rails when said sand box is in position over said carriage, means by which said sand box is secured in fixed position to said carriage for rotation therewith between inverted and upright positions, means by which said sand box is disconnected from said actuating means when said sand box is secured to said carriage to thereby permit said sand box to rotate with said carriage, a mold curing oven which is normally spaced from said carriage, means by which said curing oven and said carriage are brought into juxtaposition to complete the curing of a partially cured mold shell on said pattern, stripping mechanism by which a completed shell mold is stripped from said pattern secured to said carriage for rotation therewith, said sand box being divided into upper and lower compartments by a set of louvers, said upper compartment being adapted to contain a supply of molding mixture and said lower compartment being adapted to encompass a pattern mounted on said carriage, means by which said louvers are opened when said box is in an upright position over said carriage and pattern to thereby dump molding mixture from said upper compartment onto said pattern, means by which said louvers are closed after said sand box has been rotated to inverted position with said carriage to thereby trap in said upper compartment the unbonded molding mixture which was returned to said upper compartment by the inverting of said sand box, the leading end of the lower compartment of said sand box being provided with a vertically slidable door, and means by which said door is maintained in lower closed position when said sand box is in engagement with said carriage and in upper open position when said sand box is disposed in laterally spaced relation to said carriage, said door being operative when in upper open position to permit said sand box to clear a pattern on said carriage as said sand box is moved into and out of position over said carriage and pattern.

31. A shell-mold forming machine as defined in claim 30 in which the leading and trailing ends of the lower compartment of said sand box are each provided with a vertically slidable door and an arm pivotally secured to said sand box by which said door is raised and lowered, a vertically reciprocal bar connected to and between said arms through which said arms are actuated in unison to simultaneously raise and lower said doors, and means carried by said carriage which is operative to engage and raise and lower said bar when said sand box is secured in position over said carriage.

32. A shell mold forming machine of the character described comprising a pattern carriage which is rotatably mounted for rotation about a horizontal axis and is adapted to have a pattern removably secured thereto, means by which said pattern is heated, means by which said carriage is rotated back and forth between upright and inverted positions, a sand box which is normally disposed in laterally spaced relation to said carriage adjacent one side thereof and is adapted to contain a supply of molding mixture for application to the upper face of said pattern, means by which said sand box and said carriage are brought into juxtaposition with said sand box disposed over said carriage and a pattern secured thereon, means by which said sand box is clamped to said carriage for rotation therewith, a curing oven spaced from said carriage, means by which said curing oven and said carriage are brought into juxtaposition for completing the curing of a partially cured mold shell on said pattern, stripping mechanism mounted on said carriage for rotation therewith whereby a completed mold shell is stripped from said pattern, said leading and trailing ends of the lower compartment of said sand box being provided with a pair of vertically slidable doors, and means by which said doors are maintained in lower closed position when said sand box is in engagement with said carriage and in upper open position when said sand box is disposed in laterally spaced relation to said carriage.

33. A shell-mold forming machine as defined in claim 32 in which a mask is carried by and between said doors adjacent the lower ends thereof for up and down movement with said doors, said mask being operative to blank off portions of said pattern and thereby prevent molding mixture being dumped onto said portions upon the opening of said louvers.

34. A shell mold forming machine of the character described comprising a pattern carriage which is rotatably mounted for rotation about a horizontal axis and is adapted to have a pattern removably secured thereto, means by which said pattern is heated, means by which said carriage is rotated back and forth between upright and inverted positions, a sand box which is normally disposed in laterally spaced relation to said carriage adjacent one side thereof and is adapted to contain a supply of molding mixture for application to the upper face of said pattern, means by which said sand box and said carriage are brought into juxtaposition with said sand box disposed over said carriage and a pattern secured thereon, means by which said sand box is clamped to said carriage for rotation therewith, a curing oven spaced from said carriage, means by which said curing oven and said carriage are brought into juxtaposition for completing the curing of a partially cured mold shell on said pattern, and stripping mechanism mounted on said carriage for rotation therewith whereby a completed mold shell is stripped from said pattern, the leading end of the lower compartment of said sand box being provided with a vertically slidable door, and means by which said door is maintained in lower closed position when said sand box is in engagement with said carriage and in upper open position when said sand box is disposed in laterally spaced relation to said carriage, said door being operative when in upper open position to permit said sand box to clear a pattern on said carriage as said sand box is moved into and out of position over said carriage and pattern.

35. A shell mold forming machine of the character described comprising a pattern carriage which is rotatably mounted for rotation about a horizontal axis and is adapted to have a pattern removably secured thereto, means by which said pattern is heated, means by which said carriage is rotated back and forth between upright and inverted positions, a sand box which is normally disposed in laterally spaced relation to said carriage adjacent one side thereof and is adapted to contain a supply of molding mixture for application to the upper face of said pattern, means by which said sand box and said carriage are brought into juxtaposition with said sand box disposed over said carriage and a pattern secured thereon, means by which said sand box is clamped to said carriage for rotation therewith, a curing oven spaced from said carriage, means by which said curing oven and said carriage are brought into juxtaposition for completing the curing of a partially cured mold shell on said pattern, and stripping mechanism mounted on said carriage for rotation therewith whereby a completed mold shell is stripped from said pattern, the leading and trailing ends of the lower compartment of said sand box each being provided with a vertically slidable door and an arm pivotally secured to said sand box by which said door is raised and lowered, a vertically reciprocal bar connected to and between said arms through which said arms are actuated in unison to simultaneously raise and lower said doors, and means carried by said carriage which is operative to engage and raise and lower said bar when said sand box is secured in position over said carriage.

36. A shell mold forming machine of the character described comprising a pattern carriage adapted to have a pattern removably secured thereon, means by which said carriage is rotatably supported for rotation about a fixed horizontal axis, means by which said carriage is rotated back and forth between upright and inverted positions, a vertically reciprocal mold curing oven normally disposed in aligned vertically spaced relation above said carriage, a sand box adapted to contain a supply of molding mixture for application to the upper surface of said pattern, said sand box being normally disposed in laterally spaced relation to said carriage, means by which said sand box is moved into and out of position between said carriage and said mold curing oven and over a pattern mounted on said carriage, means by which said sand box is releasably clamped to said carriage for rotation therewith, means by which said curing oven is moved into and out of engagement with said carriage over and around a pattern mounted on said carriage, stripping mechanism mounted on said carriage by which a completed mold is stripped from said pattern, said sand box being divided into upper and lower compartments by a set of louvers, the leading end of said lower compartment having a door which is adapted to be opened and closed, said upper compartment being adapted to contain a supply of molding mixture and said lower compartment being adapted to encompass a pattern mounted on said carriage, means by which said louvers are opened when said sand box is in upright position over said pattern and carriage to thereby dump molding mixture from said upper compartment onto said pattern, means by which said door is maintained closed when said sand box is in engagement with said carriage, means by which said louvers are closed after said sand box has been rotated to inverted position with said carriage to thereby trap in said upper compartment the unbonded molding mixture which was returned to said upper compartment by the inverting of said sand box, and means by which said door is maintained open when said sand box is disposed in laterally spaced relation to said sand box.

37. A shell-mold forming machine as defined in claim 36 in which a mask is removably secured in said lower compartment, said mask being operative to blank off portions of said patterns and thereby prevent molding mixture being dumped onto said portions upon the opening of said louvers.

38. A shell-mold forming machine as defined in claim 37 in which said mask is mounted in said lower compartment for vertically reciprocal movement therein, and means are provided by which said mask is raised or lowered at predetermined times.

39. A shell mold forming machine of the character described comprising a pattern carriage adapted to have a pattern removably secured thereon, means by which said carriage is rotatably supported for rotation about a fixed horizontal axis, means by which said carriage is rotated back and forth between upright and inverted positions, a vertically reciprocal mold curing oven normally disposed in aligned vertically spaced relation above said carriage, a sand box adapted to contain a supply of molding mixture for application to the upper surface of said pattern, said sand box being normally disposed in laterally spaced relation to said carriage, means by which said sand box is moved into and out of position between said carriage and said mold curing oven and over a pattern mounted on said carriage, means by which said sand box is releasably clamped to said carriage for rotation therewith, means by which said curing oven is moved into and out of engagement with said carriage over and around a pattern mounted on said carriage, stripping mechanism mounted on said carriage by which a completed mold is stripped from said pattern, said sand box being divided into upper and lower compartments by a set of louvers, said upper compartment being adapted to contain a supply of molding mixture and said lower compartment being adapted to encompass a pattern mounted on said carriage, means by which said louvers are opened when said sand box is in an upright position over said carriage and pattern to thereby dump molding mixture from said upper compartment onto said pattern, and means by which said louvers are closed after said sand box has been rotated to inverted position with said carriage to thereby trap in said upper compartment the unbonded molding mixture which was returned to said upper compartment by the inverting of said sand box, a mask removably secured in said lower compartment, said mask being operative to blank off portions of said patterns and and thereby prevent molding mixture from being dumped onto said portions upon the opening of said louvers.

40. A shell-mold forming machine as defined in claim 39 in which said mask is mounted in said lower compartment for vertically reciprocal movement therein, and means are provided by which said mask is raised or lowered at predetermined times.

References Cited in the file of this patent

UNITED STATES PATENTS

| | | |
|---|---|---|
| 2,659,944 | Valyi | Nov. 24, 1953 |
| 2,724,158 | Davis et al. | Nov. 22, 1955 |
| 2,794,222 | Bachner | June 4, 1957 |